(12) United States Patent
Tseng et al.

(10) Patent No.: US 11,294,241 B2
(45) Date of Patent: Apr. 5, 2022

(54) COMPOSITE PHOTOALIGNMENT LAYER

(71) Applicant: The Hong Kong University of Science and Technology, Hong Kong (CN)

(72) Inventors: Man Chun Tseng, Hong Kong (CN); Abhishek Kumar Srivastava, Aishbagh Lucknow (IN); Cuiling Meng, Hong Kong (CN); Vladimir Grigorievich Chigrinov, Hong Kong (CN); Hoi Sing Kwok, Hong Kong (CN); Yue Shi, Hong Kong (CN); Yeuk Lung Jacob Ho, Hong Kong (CN); Chenxiang Zhao, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 17/028,464

(22) Filed: Sep. 22, 2020

(65) Prior Publication Data
US 2021/0011343 A1 Jan. 14, 2021

Related U.S. Application Data

(63) Continuation of application No. 15/785,723, filed on Oct. 17, 2017, now Pat. No. 10,816,855, which is a (Continued)

(51) Int. Cl.
 *G02F 1/1337* (2006.01)
 *B05D 3/06* (2006.01)
 *B05D 1/00* (2006.01)

(52) U.S. Cl.
 CPC .. *G02F 1/133711* (2013.01); *G02F 1/133788* (2013.01); *B05D 1/005* (2013.01);
 (Continued)

(58) Field of Classification Search
 CPC .......... G02F 1/133711; G02F 1/13788; G02F 1/137; G02F 2001/133726;
 (Continued)

(56) References Cited

U.S. PATENT DOCUMENTS 5,310,502 A 5/1994 Marshall
5,409,635 A 4/1995 Rosch et al.
(Continued)

FOREIGN PATENT DOCUMENTS

EP 1209515 A1 5/2002
EP 1224503 B1 6/2006
(Continued)

OTHER PUBLICATIONS

U.S. Appl. No. 15/785,723, filed Oct. 17, 2017.
(Continued)

*Primary Examiner* — Ruiyun Zhang
(74) *Attorney, Agent, or Firm* — Leydig, Voit & Mayer, Ltd.

(57) ABSTRACT

A composite photoalignment layer for aligning liquid crystal molecules includes: a monomeric material; a photoinitiator or a thermal initiator; and an azo dye material. A method for preparing a composite photoalignment layer for aligning liquid crystal molecules includes: mixing, in solution form, a monomeric material, a photoinitiator or a thermal initiator, and an azo dye material; coating the mixed solution onto a substrate to form a thin film; exposing the thin film to polarized light; and, with a thermal initiator, heating the thin film to polymerize the monomeric material and form a solid thin film.

17 Claims, 21 Drawing Sheets

Related U.S. Application Data continuation-in-part of application No. PCT/CN2016/103739, filed on Oct. 28, 2016.

(60) Provisional application No. 62/496,381, filed on Oct. 17, 2016, provisional application No. 62/493,840, filed on Jul. 19, 2016, provisional application No. 62/285,435, filed on Oct. 29, 2015.

(52) U.S. Cl.
CPC .......... *B05D 3/065* (2013.01); *C09K 2323/00* (2020.08); *C09K 2323/02* (2020.08); *G02F 1/133715* (2021.01); *G02F 1/133726* (2021.01)

(58) Field of Classification Search
CPC ........ G02F 2001/133715; B05D 1/006; B05D 3/06; B05D 3/061; B05D 3/065; C09K 2323/00; C09K 2323/02
USPC .......... 428/1.1, 1.2, 1.3, 1.31; 427/162, 508, 427/553; 349/123, 127
See application file for complete search history.

(56) References Cited

U.S. PATENT DOCUMENTS

| | | |
|---|---|---|
| 5,552,916 A | 9/1996 | O'Callaghan et al. |
| 5,753,139 A | 5/1998 | Wand et al. |
| 5,859,680 A | 1/1999 | Jungbauer et al. |
| 5,973,762 A | 10/1999 | Vorfloussev |
| 6,351,301 B1 | 2/2002 | Takatori |
| 6,671,028 B1 | 12/2003 | Beresnev et al. |
| 6,760,088 B2 | 7/2004 | Choi et al. |
| 6,919,404 B2 | 7/2005 | Gibbons et al. |
| 7,597,945 B2 | 10/2009 | Hirai et al. |
| 7,955,665 B2 | 6/2011 | Nishiyama et al. |
| 8,009,264 B2 | 8/2011 | Kuwana et al. |
| 8,491,973 B2 | 7/2013 | Nam |
| 2002/0098295 A1 | 7/2002 | Yip et al. |
| 2003/0021913 A1 | 1/2003 | O'Neill et al. |
| 2007/0232780 A1 | 10/2007 | Tamura |
| 2008/0284973 A1 | 11/2008 | Wall et al. |
| 2009/0269513 A1 | 10/2009 | Nishiyama et al. |
| 2011/0144299 A1 | 6/2011 | Yang et al. |
| 2012/0301628 A1 | 11/2012 | Jo et al. |
| 2013/0016295 A1 | 1/2013 | Walba |
| 2013/0169909 A1 | 7/2013 | Srivastava et al. |
| 2013/0203920 A1 | 8/2013 | Tanabe et al. |
| 2015/0029453 A1 | 1/2015 | Guo et al. |
| 2015/0056544 A1 | 2/2015 | Miyake et al. |

FOREIGN PATENT DOCUMENTS

| | | |
|---|---|---|
| EP | 1793996 | 6/2007 |
| EP | 1989586 | 11/2008 |
| EP | 1710617 B1 | 10/2010 |
| WO | WO 2005/045485 A1 | 5/2005 |
| WO | WO 2013/050120 A1 | 4/2013 |

OTHER PUBLICATIONS

State Intellectual Property Office of the P.R. China, International Search Report in International Application No. PCT/CN2016/103739 (dated Feb. 6, 2017).

Alla, et al., "Light-control of liquid crystal alignment from vertical to planar," *Applied Physics Letters*, 102: 233505 (2013).

Bawa et al., "Novel alignment technique for surface stabilized ferroelectric liquid crystal," *Applied Physics Letters*, 57:1398 (1990).

Chen et al., "Pretilt angle control for single-cell-gap transflective liquid crystal cells," *Applied Physics Letters*, 92: 091102 (2008).

Guo et al., "Polymer and azo dye composite: a photo-alignment layer for liquid crystals," *Liquid crystals*, 41(10): 1465-1472, (2014).

Hasebe et. al., "Performance of Novel LC-Photo-Aligning Cinnamoyl Side-Chain Polymers," *45th Society for Information Display International Symposium*, San Diego, CA, pp. 389-392 (Jun. 2014).

Hegde et al., "Azo containing thiophene based prop-2-enoates for photoalignment of a nematic liquid crystal," *Journal of Materials. Chemistry. C*, 1: 3600, (2013).

Lu et al., "Spatial and Orientational Control of Liquid Crystal Alignment Using a Surface Localized Polymer Layer," *Applied Physics Letters*, 101: 251912 (2012).

Lu et al., "Surface localized polymer aligned liquid crystal lens," *Optics Express*, vol. 21, No. 6: 7133-7138 (2013).

Oh et al., "Near-zero pretilt alignment of liquid crystals using polyimide films doped with UV-curable polymer" *Optics Express*, vol. 23, No. 2, 1044, (2015).

Oh et al., "Electro-Optical Performance of a Zero Pre-Tilt Liquid Crystal Cell Fabricated by Using the Field-Induced UV-Alignment Method," *Journal of Display Technology*, vol. 12, No. 1, pp. 40-44 (2016).

Kimura et al., "Photoinduced alignment of polymerisable liquid crystals on photoreactive polymers containing 2,6-bis(benzylidene)-1-cyclohexanone units in the main chain," *Liquid Crystals* 43(7): 910-919, (12 pages) (2016).

Pozhidaev et al., "Photoalignment of Ferroelectric Liquid Crystals by Azodye Layers," *The Japan Society of Applied Physics.*, vol. 43, No. 8A, pp. 5440-5446 (2004).

Sakamoto et al., "In-plane Molecular Order of a Photo-oriented Polyamic Acid Film: Enhancement upon Thermal Imidization," *Molecular Crystals and Liquid Crystals*, 412:1, pp. 293-299 (2014).

Schadt et al., "Surface-Induced Parallel Alignment of Liquid Crystals by Linearly Polymerized Photopolymers," *Jpn. J. Appl. Phys.*, vol. 31, pp. 2155-2164 (1992).

Shteyner et al., "Submicron-scale liquid crystal photo-alignment," *Soft Matter*, 9: 5160 (2013).

Srivastava et al., "Fast Ferroelectric liquid crystal grating based on orthogonal photo alignments," *Applied Physics Letters*, 101: 031112 (2012).

Srivastava et al., "Polymer and azo-dye composite: a photo-alignment layer for liquid crystals", *Liquid Crystals*, 41:10, 1465-1472 (2014).

Tseng et.al., "Strengthening of Liquid Crystal Photoalignment on Azo Dye Films: Passivation by Reactive Mesogens," *RSC Advances*, 6, 48181-481888 (2016).

Yaroshchuk et al., "Stabilization of liquid crystal photoaligning layers by reactive rnesogens," *Applied Physics Letters*, 95: 021902 (2009).

Matsumori, et al., "Photoalignment of an Azobenzene-Based Chromonic Liquid Crystal Dispersed in Triacetyl Cellulose: Single-Layer Alignment Films with an Exceptionally High Order Parameter," *ACS Appl. Mater. Interfaces*, 7: 11074-11078 (2015).

COMPOSITE PHOTOALIGNMENT LAYER

CROSS-REFERENCE TO RELATED APPLICATIONS

This patent application is a continuation of U.S. patent application Ser. No. 15/785,723, filed Oct. 17, 2017, which is a continuation-in-part of International Application No. PCT/CN2016/103739, filed on Oct. 28, 2016, which claims priority to U.S. Provisional Patent Application No. 62/285,435, filed Oct. 29, 2015, and U.S. Provisional Patent Application No. 62/493,840, filed Jul. 19, 2016. U.S. patent application Ser. No. 15/785,723 also claims priority to U.S. Provisional Patent Application No. 62/496,381, filed Oct. 17, 2016. The disclosures of the aforementioned applications are hereby incorporated by reference in their entireties.

BACKGROUND

In-plane switching displays, fringe field switching displays, and field sequential color displays based on ferroelectric liquid crystal display have recently become more popular because of their ability to provide relatively high optical quality and resolution, and it is desirable to for display cells to have a fast response time, a wide viewing angle, and high resolution. For example, the use of electrically suppressed helix ferroelectric liquid crystals provides great optical quality (like nematic liquid crystals), with a relatively fast switching response and a relatively low driving voltage.

Applications of liquid crystal display cells having fast response, high resolution and high optical contrast may include, for example, fast response photonics devices such as modulators, filters, attenuators, and displays with high resolution requirements (e.g., pico projectors, 3D displays, microdisplays, high-definition televisions (HDTVs), ultra high-definition (UHD) displays, etc.).

SUMMARY

In an exemplary embodiment, the invention provides a composite photoalignment layer for aligning liquid crystal molecules, including: a monomeric material; a photoinitiator; and an azo dye material.

In another exemplary embodiment, the invention provides a method for preparing a composite photoalignment layer for aligning liquid crystal molecules, the method including: mixing, in solution form, a monomeric material, a photoinitiator, and an azo dye material; coating the mixed solution onto a substrate to form a thin film; and exposing the thin film to polarized light to form a solid thin film.

In yet another exemplary embodiment, the invention provides a composite photoalignment layer for aligning liquid crystal molecules, including: a monomeric material; a thermal initiator; and an azo dye material.

In yet another exemplary embodiment, the invention provides a method for preparing a composite photoalignment layer for aligning liquid crystal molecules, the method including: mixing, in solution form, a monomeric material, a thermal initiator, and an azo dye material; coating the mixed solution onto a substrate to form a thin film; exposing the thin film to polarized light to impose a single-domain or multi-domain alignment; and heating the thin film to polymerize the monomeric material and form a solid thin film.

DETAILED DESCRIPTION

Figure 1:
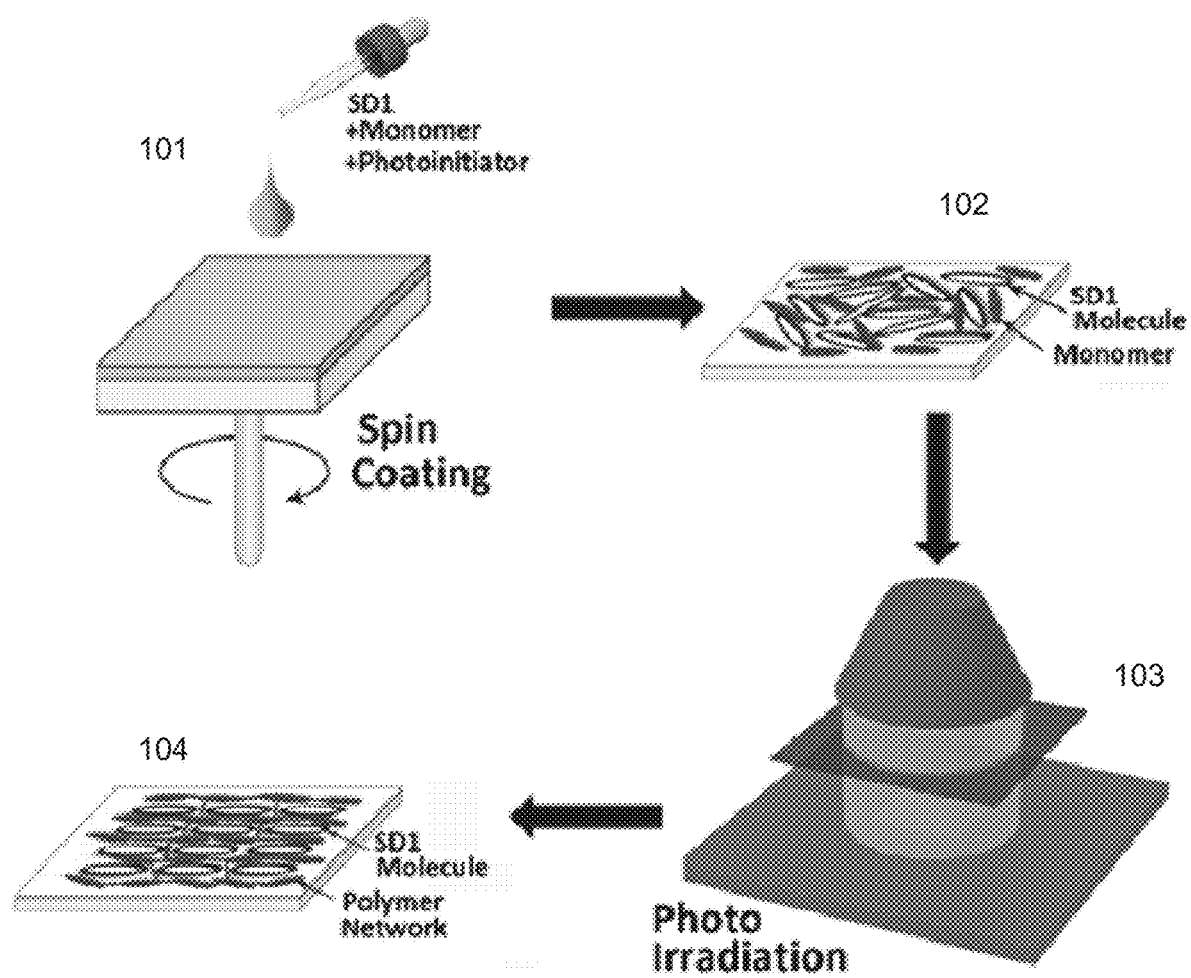
FIG. 1 depicts a schematic example of an exemplary process for preparing a composite photoalignment layer for aligning liquid crystal molecules according to a first exemplary embodiment.

The electro-optical modes and pixel structure manipulations needed for certain liquid crystal display cells having fast response, high resolution and high optical contrast may demand highly optimized photoalignment to provide zero pre-tilt angle, large surface uniformity and multi-domain alignment (multi-domain alignment in a pixel improves visual appearance and viewing characteristics, including viewing angle characteristics).

Conventional photoalignment materials are not able to offer all of these qualities. Conventional azo dye alignment layers are able to provide good alignment (with high anchoring energy, small pre-tilt angle, and uniformity over a relatively large area) for liquid crystals in display cells, allowing the liquid crystal display cells to achieve very high pixel resolution. However, conventional azo dye alignment layers are not stable against chemical, thermal and photo exposure.

Exemplary embodiments of the invention provide a composite photoalignment layer for liquid crystals, the composite photoalignment layer including a composite mixing of at least a monomer ("monomeric material"), a thermal free radical initiator ("thermal initiator") or a photoinitiator, and an azo dye material (such as an SD1 azo dye). By introducing a polymer network into the azo dye material (via thermally-initiated or photoinitiated polymerization), exemplary embodiments of the invention provide a stabilized composite azo dye photoalignment layer which is stable against ultraviolet light exposure, heat, and other environmental conditions.

The composite photoalignment layer provides good alignment characteristics (e.g., low pretilt angle, high polar and azimuthal anchoring energy, low residual direct current (RDC) voltage, high voltage holding ratio (VHR), low image sticking parameter), comparable to that of conventional polyimide layers, and meets industry and consumer standards (e.g., with respect to RDC voltage, VHR and anchoring energy). The composite photoalignment layer is adaptable to sophisticated surfaces and is easy to pattern, and is thus suitable for use in a variety of photonic elements and displays, including but not limited to in-plane switching (IPS) and ferroelectric liquid crystal (FLC) displays, as well as photonics devices such as gratings, modulators, and polarization converters.

In a first exemplary embodiment, starting with a mixture of a monomer, a photoinitiator, and an azo dye material (at concentrations configured to provide stability for the azo dye material without affecting the alignment provided by the photoalignment layer), and by using a single light exposure to provide both photoinduced reorientation of the azo dye material (photoalignment) and polymerization of the monomer, a composite photoalignment layer with good alignment characteristics (e.g., high anchoring energy, small pre-tilt angle, and uniformity over a relatively large area) is achieved. The composite photoalignment layer is thus formed in a single step irradiation/exposure, and provides a good and stable photoalignment for liquid crystals.

In a second exemplary embodiment, the process starts with a mixture of a monomer, a thermal initiator, and an azo dye material (at concentrations configured to provide stability for the azo dye material without affecting the alignment provided by the photoalignment layer). Then, in a first step, a preferred orientation of the easy axis of the azo dye photoalignment layer is realized. In a second step, thermal polymerization is performed.

Photoalignment provides the ability to realize single-domain or multi-domain alignment with an extremely small pretilt angle in a single step of irradiation/exposure. Using a single-step photoalignment process with, for example, a patterned wave plate, a multi-domain photoalignment layer may be achieved with highly uniform alignment over a large size. Further, because the azo dye material offers only in-plane molecular diffusion from one direction to another, and does not go out of plane, the generated pre-tilt angle is very small.

Additionally, according to exemplary embodiments of the invention, the anchoring energies of the composite photoalignment layer are adjustable by controlling the irradiation dosage, which allows for optimization of alignment quality, for example, for nematic LCs and ferroelectric LCs. Thus, exemplary embodiments of the invention are suitable for applications requiring precise control of anchoring energies, including but not limited to, for example, ferroelectric liquid crystal displays.

A liquid crystal photoalignment layer shows a preferred alignment direction after being irradiated by polarized light with sufficiently high irradiation energy of certain wavelength (the polarized light imposes an alignment direction on the photoalignment layer). Photoalignment provides several advantages over conventional rubbing alignment techniques. For example, rubbing may cause mechanical damage or electrostatic charge, which degrades manufacturing yield. Photoalignment avoids mechanical contact with the aligning layer, and thus minimizes such mechanical damage and electrostatic charging. Photoalignment is also easier to implement with respect to large substrates and provides better uniformity for high resolution displays. Additionally, photoalignment provides the ability to realize multi-domain alignment on a micro-scale or even on a nano-scale. Furthermore, photoalignment may be utilized with respect to a non-flat surface such as a curved or flexible surface (e.g., for curved LCD panels or flexible displays) or surfaces with microscopic confinements.

There are several approaches to photoalignment, including for example, the following categories: (1) photoalignment by cis-trans isomerization of azo dye molecules; (2) photocrosslinking of monomers into polymers; (3) photodegradation of a polymer layer; and (4) photoinduced reorientation of azo dye molecules. Among these, photoinduced reorientation of azo dye molecules provides certain advantages—for example, sufficiently high polar and azimuthal anchoring energies for liquid crystal alignment, which may be as strong as a commercial polyimide film based on conventional rubbing; high voltage holding ratio (VHR) and low residual direct current (RDC) voltage is low, which is advantageous for liquid crystal alignment; and very small pretilt angle (e.g., less than 1 degree), which is advantageous for display modes that require such low pretilt angles, such as the in-plane switching (IPS) mode and derivatives thereof such as the fringe-field switching (FFS) mode. Further, photoinduced reorientation of azo dyes may be achieved with polarized light over a large range of wavelengths, including for example blue light or ultraviolet light. This allows high power light-emitting diodes (LEDs) to be used as the light source so as to reduce the cost of the photoalignment equipment. Further, photoinduced reorientation of azo dyes is applicable to optically rewritable displays, where the rewritable property of the azo dye allows for writing and erasing images as desired.

Photoalignment based on photoinduced reorientation of azo dye molecules is thus able to achieve sufficiently high polar and azimuthal anchoring energy, high VHR, appropriate pre-tilt angles, and uniform alignment. Additionally, photoalignment based on photoinduced reorientation of azo dye molecules is easily rotatable using blue light and provides anchoring energy comparable to a commercial polyimide film with very low pretilt angle. Photoalignment based on photoinduced reorientation of azo dye molecules may be used in a wide range of LC devices, including for example, IPS and FLC displays. Photoalignment based on photoinduced reorientation of azo dye molecules is tunable based on controlling the irradiation dosage. Photoalignment based on photoinduced reorientation of azo dye molecules is further able to provide a multi-domain alignment with a distinctly defined easy axis of the alignment. Additionally, photoalignment based on photoinduced reorientation of azo dye molecules provides the ability to align nanoscopic domains so as to provide for better viewing, optical and other characteristics of liquid crystal displays.

However, as mentioned above, the photo-degradation and instability of conventional azo dye photoalignment layers hinders the deployment of azo dye photoalignment layers in certain real world applications. In particular, if a photoaligned display cell is exposed to light, the easy axis of the azo dye photoalignment layer may change and damage the alignment quality of the display cell. Further, light flux from the backlight of a display system may be strong enough to damage the alignment characteristics of the photoalignment layer within a few hours of operation.

In the first exemplary embodiment, the invention provides a composite photoalignment layer for liquid crystals that comprises a monomer, a photoinitiator, and an azo dye material in optimal relative concentrations. The composite photoalignment layer provides good, uniform alignment and is stable after being irradiated by a light source. The concentration of the photoinitiator and the monomer are tuned to provide both alignment and stabilization in a single irradiation.

In an exemplary implementation, the monomer has liquid crystal properties and is a liquid crystalline reactive mesogen; the azo dye is sulfonic dye tetrasodium5,5'-((1E,1'E)-(2,2'-disulfonato-[1,1'-biphenyl]-4,4'-diyl)bis(diazene-2,1-diyl))bis(2-hydroxybenzoate) ("SD1"); and the photoinitiator is 1-hydroxycyclohexyl phenyl ketone. It will be appreciated that in other exemplary implementations, other materials may be used. For example, in another exemplary embodiment, the photoinitiator may be 2,2-dimethoxy-1,2-diphenyl ethanone.

In one example, the process of making the composite photoalignment layer begins with mixing the monomer and azo dye at optimal relative concentrations of 50:50 (since the molecule length of the azo dye and the monomer is approximately the same). Then, the photoinitiator at 10% wt/wt of the monomer is added to the mixture. It will be appreciated that in other exemplary implementations and that with other materials, other relative concentrations of materials may be used.

The concentration of photoinitiator is tuned to optimize the rate of polymerization (e.g., to ensure that polymerization is not completed before photoalignment, which would negatively affect the optical quality). In various exemplary implementations, the concentration of photoinitiator that is added to the mixture may be varied between 1% wt/wt of the monomer to 30% wt/wt of the monomer in the solvent to optimize the balance between the rate of alignment (to achieve a certain amount of liquid crystal anchoring energy) and the rate of polymerization. Further, based on the relationship between the absorption band of the photoinitiator and the absorption band of the azo dye, different balances between the rate of alignment and the rate of polymerization may be achieved. In one example, the photoinitiator absorption band is chosen to match the absorption band of the azo dye (e.g., SD1 azo dye has absorption peaks at 365 nm and 450 nm). In other examples, the absorption band of the photoinitiator is different from the absorption band of the azo dye.

Additionally, the azimuthal anchoring energy of the composite photoalignment layer can be tuned by varying the irradiation energy as well as by balancing the rate of the alignment and the rate of polymerization.

A process for preparing a composite photoalignment layer for aligning liquid crystal molecules includes: mixing, in solution form, a monomeric material, a photoinitiator, and an azo dye material; coating the mixed solution onto a substrate to form a thin film; and exposing the thin film to polarized light to form a solid thin film. Exposing the thin film is a single step exposure that provides both alignment and polymerization for the composite photoalignment layer. The photoalignment layer may be coated onto a substrate surface based on a variety of coating techniques, including but not limited to, for example, spin coating, doctor blading, and screen printing. The polarized light may be from a polarized light source having one or more major wavelength components (e.g., such that separate irradiation bands for alignment and polymerization may be used).

FIG. 1 depicts a schematic example of this process. As shown in FIG. 1, a mixture of SD1 azo dye, monomer and photoinitiator, composited in a solvent (e.g., dimethylformamide (DMF)), in solution form, is spin coated onto a substrate at stage 101 so as to form a thin film at stage 102. Then, at stage 103, the thin film is exposed in a single step exposure that provides both alignment and polymerization for the composite photoalignment layer so as to form a solid thin film having the SD1 molecules and a polymer network formed from the monomers at stage 104. In particular, the polymerization of the monomeric material in the composite photoalignment layer causes the composite photoalignment layer to form a solid thin film, and polymerization of the monomeric material provides high liquid crystal anchoring energy (e.g., $\sim 10^{-3}$ J/m$^2$). It will be appreciated that the monomeric material may be fully polymerized in accordance with exemplary embodiments of the invention.

The particular level of the anchoring energy may be tuned based on the irradiation dosage. In one example, an anchoring energy in the range of $10^{-5}$ J/m$^2$ to $10^{-2}$ J/m$^2$ may be achieved (e.g., approximately on the order of magnitude of $10^{-5}$ J/m$^2$ or $10^{-3}$ J/m$^2$). Further, it will be appreciated that the anchoring energy may be tuned within the range of $10^{-5}$ J/m$^2$ to $10^{-2}$ J/m$^2$ by adjusting the irradiation dosage.

In an exemplary implementation, the composite photoalignment layer manifests low RDC voltage, e.g., under 10 mV.

In an exemplary implementation, the composite photoalignment layer provides electro-optical characteristics that are the same or similar to conventional polyimide alignment layers. In an example, the voltage holding ratio for a planar aligned nematic liquid crystal cell having the composite photoalignment layer is greater than 99% for a frame rate of 60 Hz.

In an exemplary implementation, the composite photoalignment layer provides alignment quality that is comparable to conventional and commercially available alignment layers.

In an exemplary implementation, the composite photoalignment layer, with full polymerization of the monomer, provides an image sticking parameter ("ISP") ratio of 1.01, which is comparable to conventional alignment layers. The image sticking parameter defines how a display panel behaves against a ghost image of a previous frame. In an example, it was demonstrated that the ISP ratio is 1.01 based on application of a stress of 6V being applied to one of two pixels of a cell for 6 hours, with the other pixel being left at 0V, and comparing the transmittance of the two pixels at a stress of 2V.

Figure 2A:
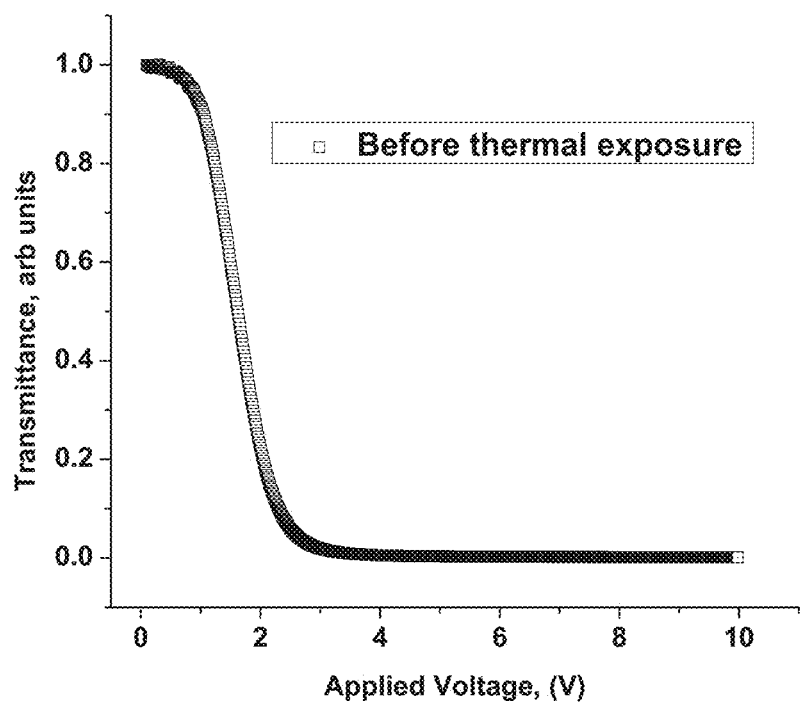
FIGS. 2A-2B show transmittance against voltage curves (TVCs) for an exemplary twisted nematic (TN) display cell before and after thermal exposure.
Figure 2B:
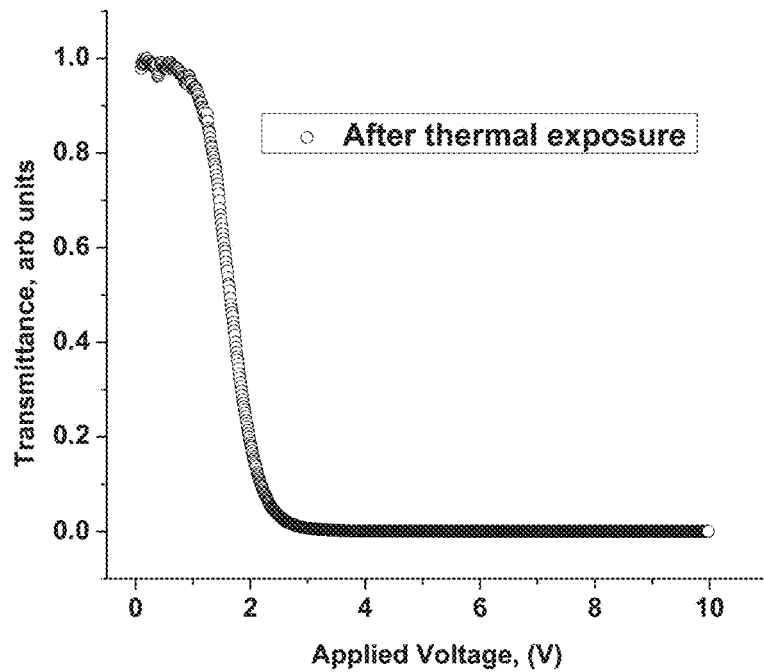
Figure 3A:
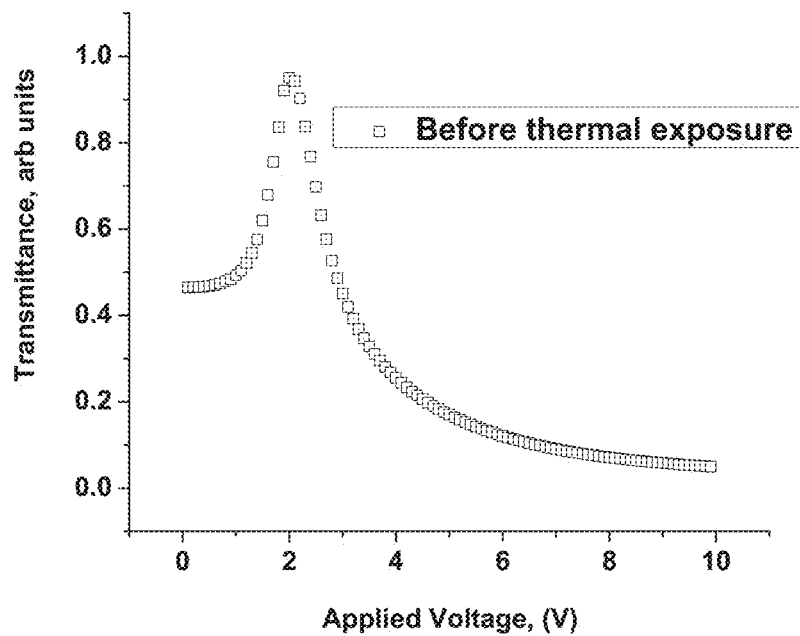
FIGS. 3A-3B show the TVCs for an exemplary electrically-controlled birefringence (ECB) nematic display cell before and after thermal exposure.
Figure 3B:
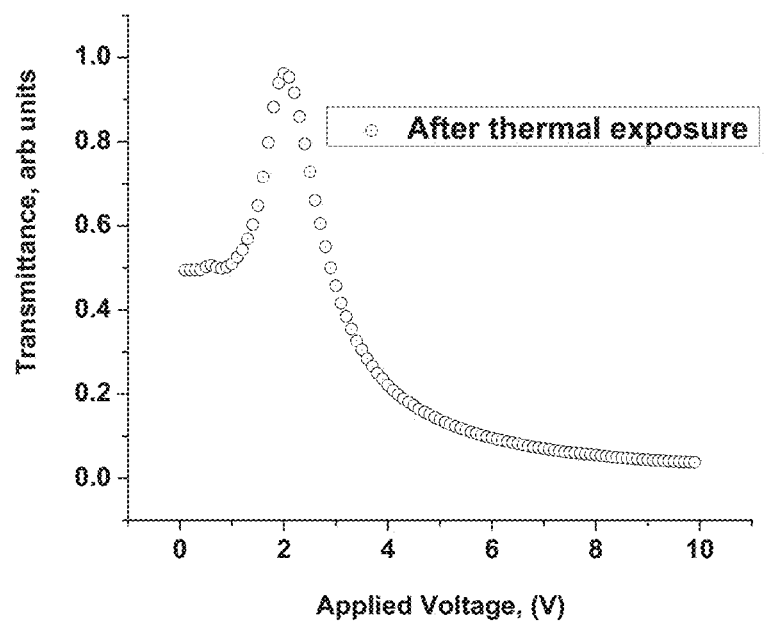

In an exemplary implementation, the composite photoalignment layer was demonstrated as being thermally stable in that it did not reveal any traces of degradation after thermal exposure at 100° C. for 24 hours in an oven. As shown in FIGS. 2A-2B and FIGS. 3A-3B, the transmittance against voltage curves (TVCs) for exemplary display cells having the composite photoalignment layer were unaffected after the thermal exposure. FIGS. 2A-2B show the TVCs for an exemplary twisted nematic (TN) display cell before and after thermal exposure. FIGS. 3A-3B show the TVCs for an exemplary electrically-controlled birefringence (ECB) nematic display cell before and after thermal exposure. The alignment quality of the exemplary display cells were also unaffected by the thermal exposure, as was apparent from visual inspection.

Figure 4A:
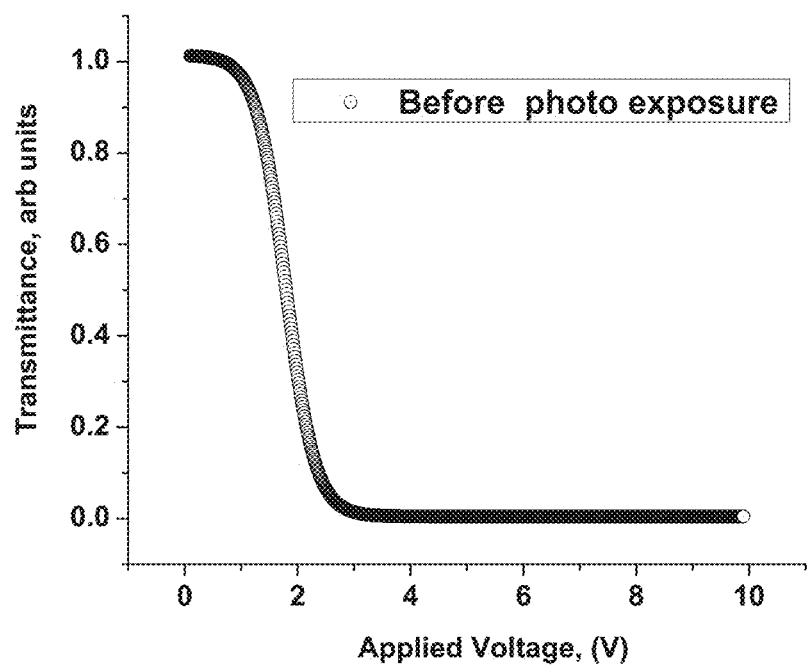
FIGS. 4A-4B show the TVCs for an exemplary TN display cell before and after photo exposure.
Figure 4B:
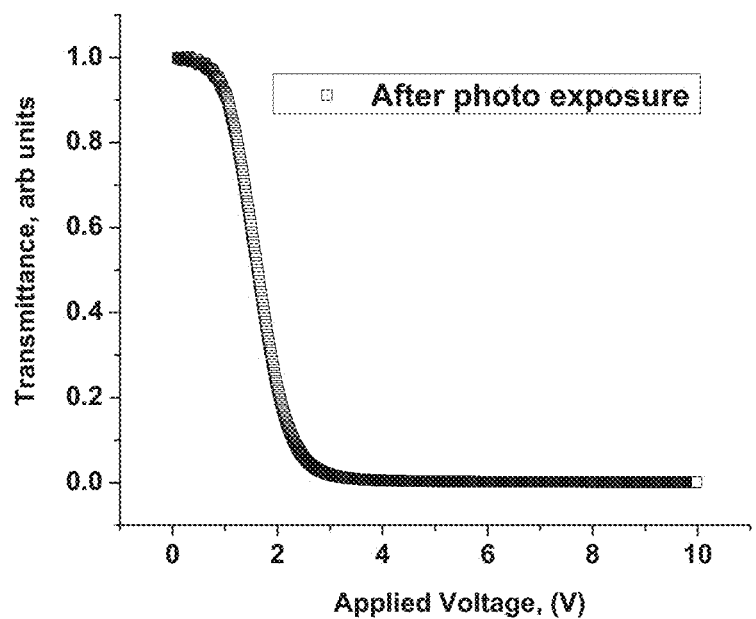
Figure 5A:
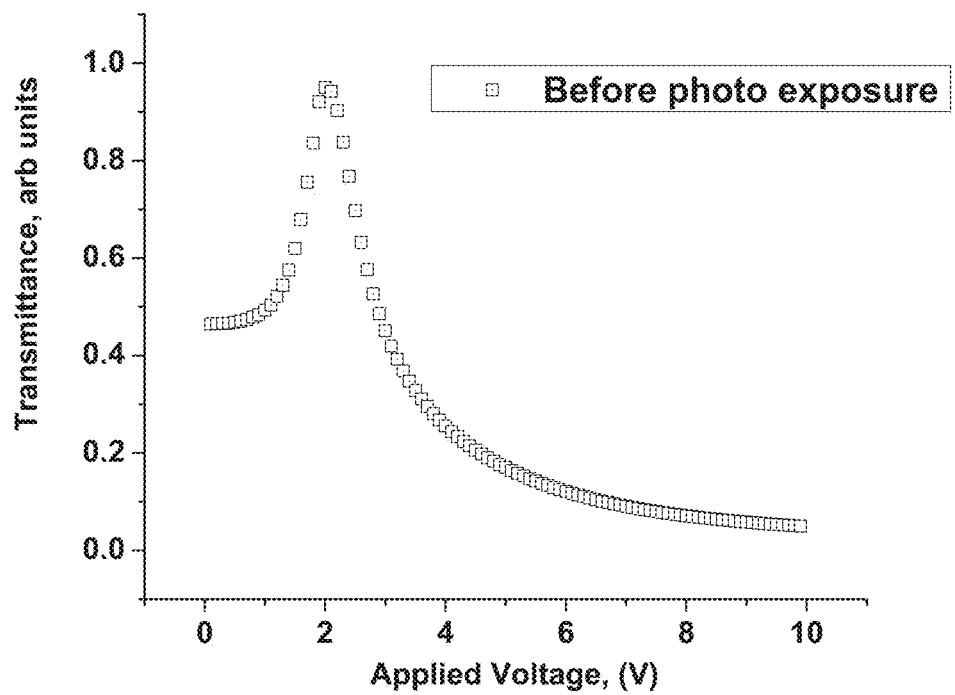
FIGS. 5A-5B show the TVCs for an exemplary ECB nematic display cell before and after photo exposure.
Figure 5B:
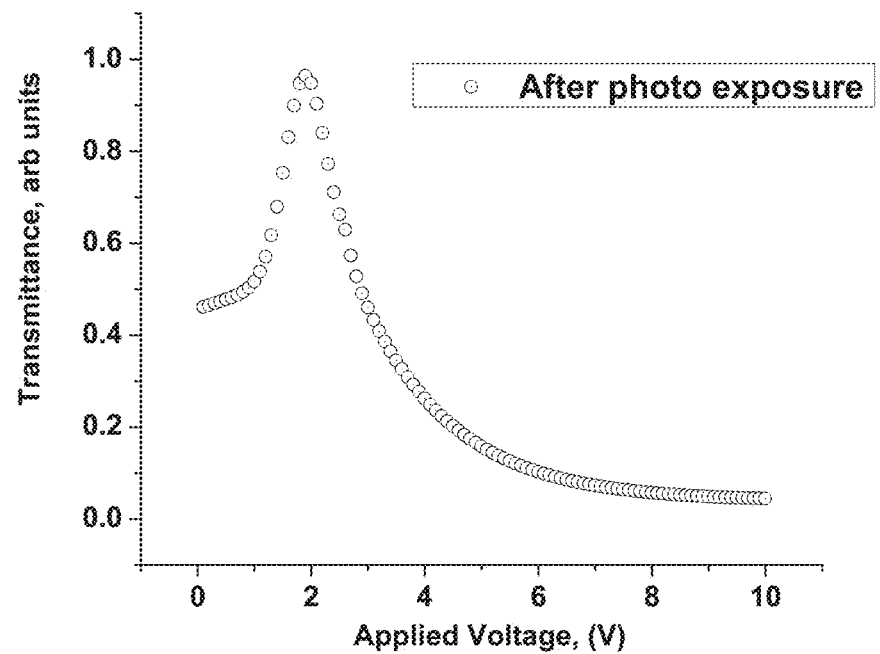

The composite photoalignment layer was also demonstrated as being optically stable and did not show any degradation after photo exposure to a light source with intensity 100 mW/cm$^2$ for 1 hour. As shown in FIGS. 4A-4B and FIGS. 5A-5B, the TVCs for exemplary display cells having the composite photoalignment layer were unaffected after the photo exposure. FIGS. 4A-4B show the TVCs for an exemplary TN display cell before and after photo exposure. FIGS. 5A-5B show the TVCs for an exemplary ECB nematic display cell before and after photo exposure. The alignment quality of the exemplary display cells were also unaffected by the photo exposure, as was apparent from visual inspection.

Figure 6:
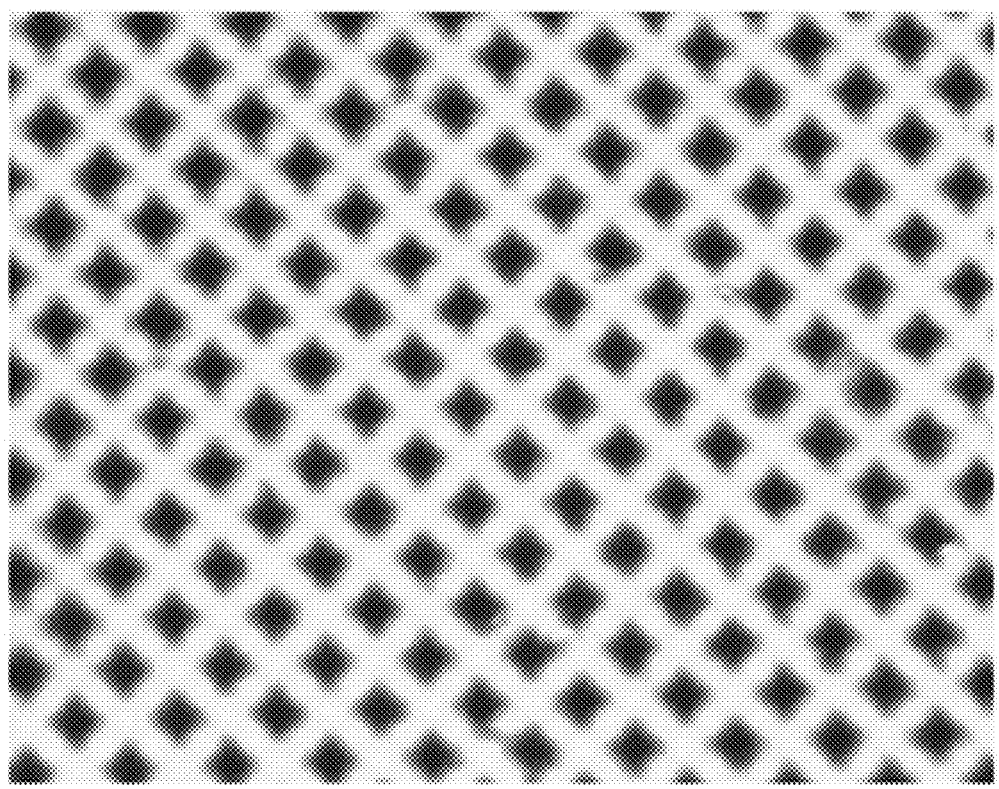
FIG. 6 is an image depicting an example of the optical texture of a multi-domain alignment.

In an exemplary implementation, during the single step exposure at stage 103 of FIG. 1, a phase mask is used to provide two or more alignment domains for the composite photoalignment layer. In an example, a patterned half wave plate with two domains with characteristic size of 20 µm is used to provide the phase mask. The phase mask rotates the plane of the impinging light and thereafter the impinging light, with degenerated plane of polarization, exposes the substrate coated with the composite photoalignment layer. As a result, the irradiated substrate provides multi-domain alignment that is stable and resistant to thermal and photo exposure, while having high quality optical and electrical parameters. An example of the optical texture of a multi-domain alignment is depicted in FIG. 6.

In the second exemplary embodiment, the invention provides a composite photoalignment layer for liquid crystals that comprises a monomer, a thermal initiator, and an azo dye material in optimal relative concentrations. The composite photoalignment layer provides good, uniform alignment after being irradiated by a light source and is stable after being heated (e.g., at 230° C. for 30 minutes, but it will be appreciated that other times and temperatures can be used). The concentration of the thermal initiator and the monomer are tuned to provide both a good alignment and stabilization for the alignment.

In an exemplary implementation, the monomer has liquid crystal properties and is 4-(3-acryloyloxypropyloxy)-benzoesure-2-methyl-1,4-phenylester; the azo dye is sulfonic azo dye tetrasodium5,5'-((1E,1'E)-(2,2'-disulfonato-[1,1'-biphenyl]-4,4'-diyl)bis(diazene-2,1-diyl))bis(2-hydroxybenzoate) ("SD1"); and the thermal initiator is 2-cyano-2-propyl dodecyl trithiocarbonate. It will be appreciated that in other exemplary implementations, other materials may be used.

In one example, the process of making the composite photoalignment layer begins with mixing the monomer and azo dye at optimal relative concentrations of 50:50 (since the molecule length of the azo dye and the monomer is approximately the same). Then, the thermal initiator at 5% wt/wt of the monomer is added to the mixture. The mixture is further dissolved in a solvent (e.g., dimethylformamide or other polar solvents). It will be appreciated that in other exemplary implementations and that with other materials, other relative concentrations of materials may be used.

In an exemplary implementation, the concentration of the azo dye and monomer combined is 1% wt/wt of the solvent, whereas the concentration of the thermal initiator is 5% wt/wt of the monomer. It will be appreciated that in other exemplary implementations and that with other materials, other relative concentrations of materials may be used.

A process for preparing a composite photoalignment layer for aligning liquid crystal molecules includes: mixing, in solution form, a monomeric material, a thermal initiator, and an azo dye material; coating the mixed solution onto a substrate to form a thin film; exposing the thin film with polarized light to impose a single-domain or multiple-domain alignment; and heating the thin film to form a solid thin film. Exposing and heating the thin film may be performed simultaneously as part of a single step or sequentially in separate steps. The thermal polymerization caused by heating the thin film does not affect the alignment properties (such as anchoring energy and surface uniformity) of the composite photoalignment layer.

Figure 7:
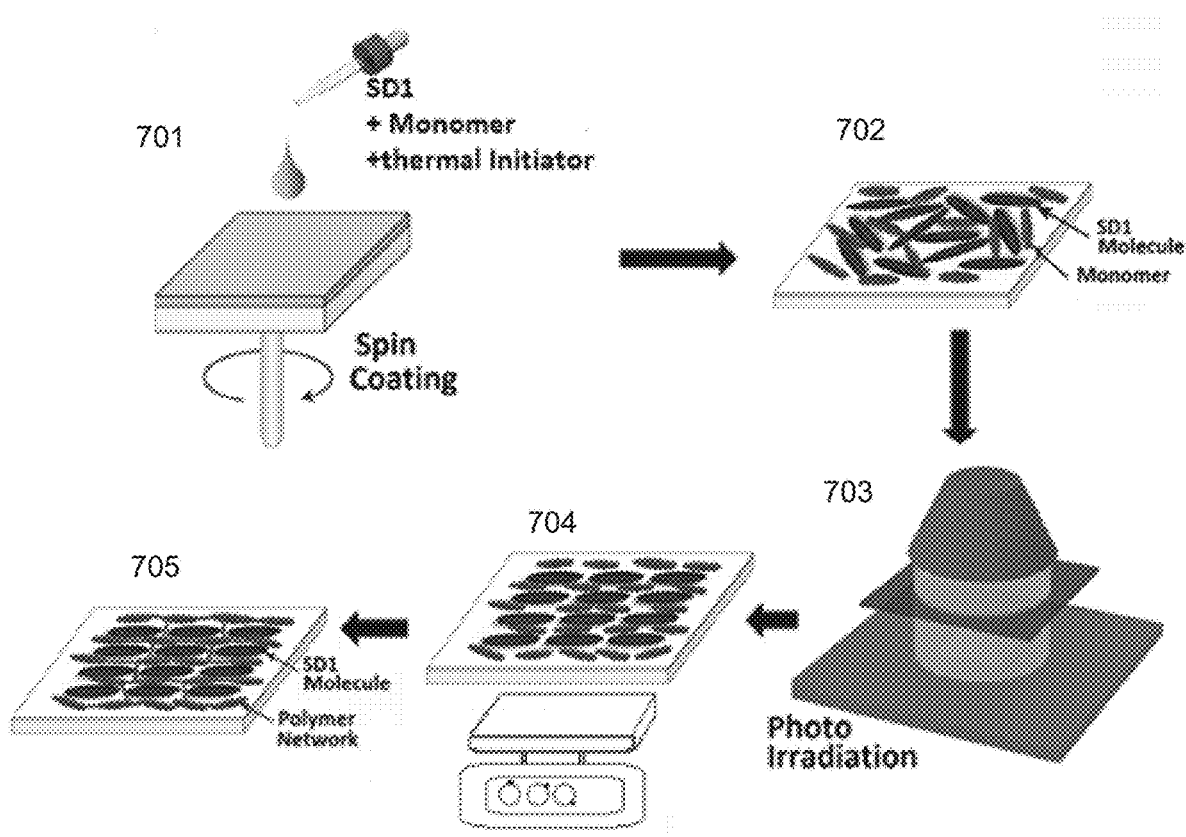
FIG. 7 depicts a schematic example of an exemplary process for preparing a composite photoalignment layer for aligning liquid crystal molecules according to a second exemplary embodiment.

FIG. 7 depicts a schematic example of this process. As shown in FIG. 7, a mixture of SD1 azo dye, monomer and thermal initiator, in solution form, is spin coated onto a substrate at stage 701 so as to form a thin film at stage 702. Then, at stage 703, the thin film is exposed in a single step exposure that provides alignment for the composite photoalignment, and at stage 704, the thin film is heated at 230° C. for 30 minutes, so as to form a solid thin film having the SD1 molecules and a polymer network formed from the monomers at stage 705. In particular, the polymerization of the monomeric material in the composite photoalignment layer causes the composite photoalignment layer to form a solid thin film, and polymerization of the monomeric material provides high liquid crystal anchoring energy (e.g., ~$10^{-3}$ J/m$^2$). It will be appreciated that the monomeric material may be fully polymerized in accordance with exemplary embodiments of the invention.

The particular level of the anchoring energy may be tuned based on the irradiation dosage. For example, an anchoring energy in the range of $10^{-5}$ J/m$^2$ to $10^{-2}$ J/m$^2$ may be achieved (e.g., approximately on the order of magnitude of $10^{-5}$ J/m$^2$ or $10^{-3}$ J/m$^2$). In another example, an anchoring energy of approximately $3 \times 10^{-3}$ J/m$^2$ may be achieved. Further, it will be appreciated that the anchoring energy may be tuned within the range of $10^{-5}$ J/m$^2$ to $10^{-2}$ J/m$^2$ by adjusting the irradiation dosage.

In an exemplary implementation, the composite photoalignment layer provides electro-optical characteristics that are the same or similar to conventional polyimide alignment layers. In an example, the voltage holding ratio for an electrical controlled birefringence liquid crystal cell having the composite photoalignment layer is greater than 99% for a frame rate of 60 Hz.

In an exemplary implementation, the composite photoalignment layer provides alignment quality that is comparable to conventional and commercially available alignment layers.

Figure 8:
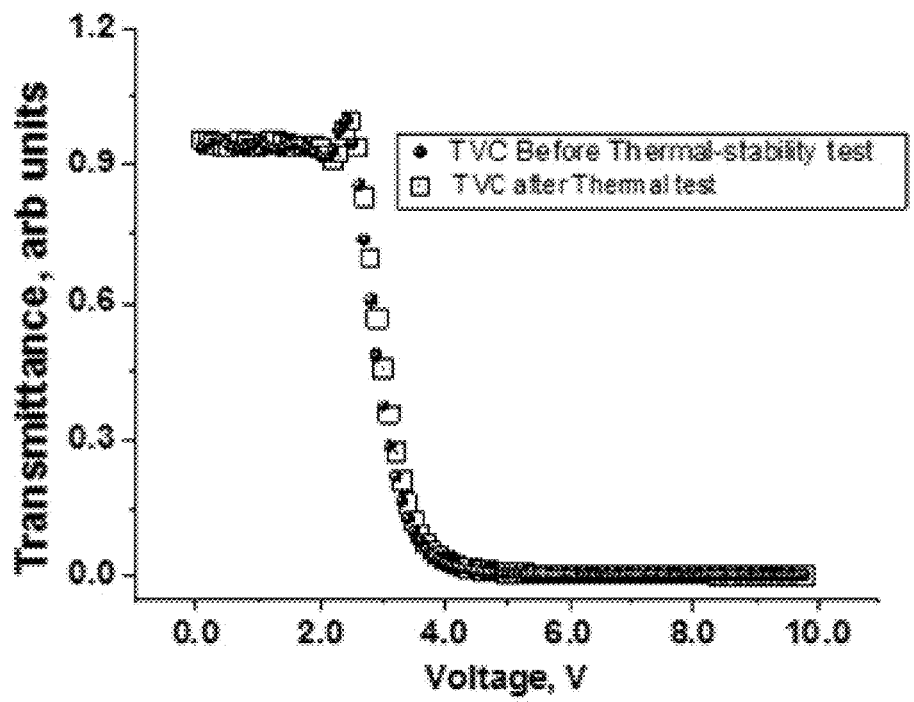
FIG. 8 shows the TVCs for an exemplary TN display cell before and after thermal exposure.
Figure 9:
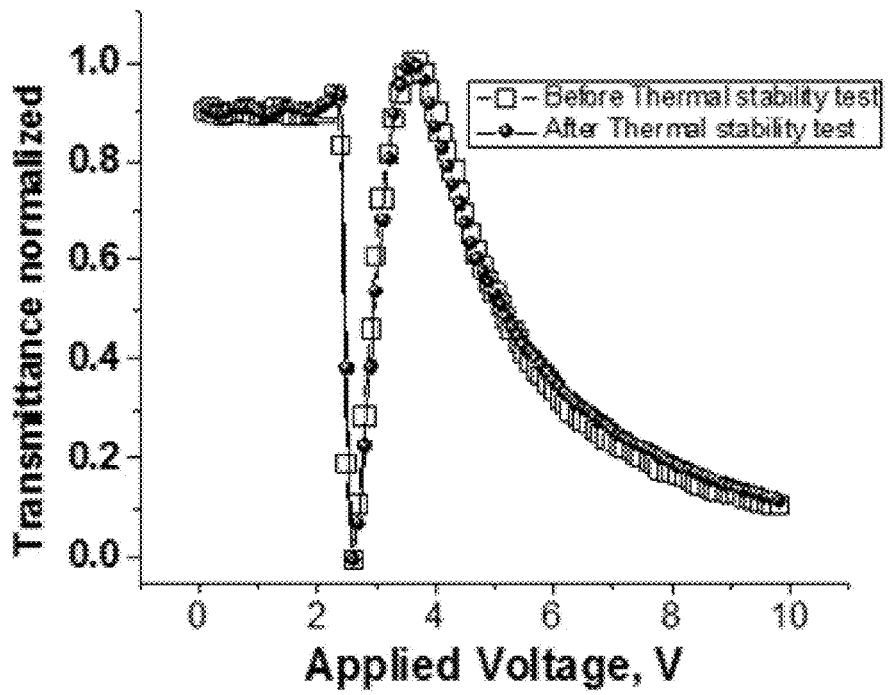
FIG. 9 shows the TVCs for an exemplary ECB nematic display cell before and after thermal exposure.

In an exemplary implementation, the composite photoalignment layer was demonstrated as being thermally stable in that it did not reveal any traces of degradation after thermal exposure at 100° C. for 24 hours in an oven. As shown in FIGS. 8 and 9, the TVCs for exemplary display cells having the composite photoalignment layer were unaffected after the thermal exposure. FIG. 8 shows the TVCs for an exemplary TN display cell before and after thermal exposure. FIG. 9 shows the TVCs for an exemplary ECB nematic display cell before and after thermal exposure. The alignment quality of the exemplary display cells were also unaffected by the thermal exposure, as was apparent from visual inspection.

Figure 10:
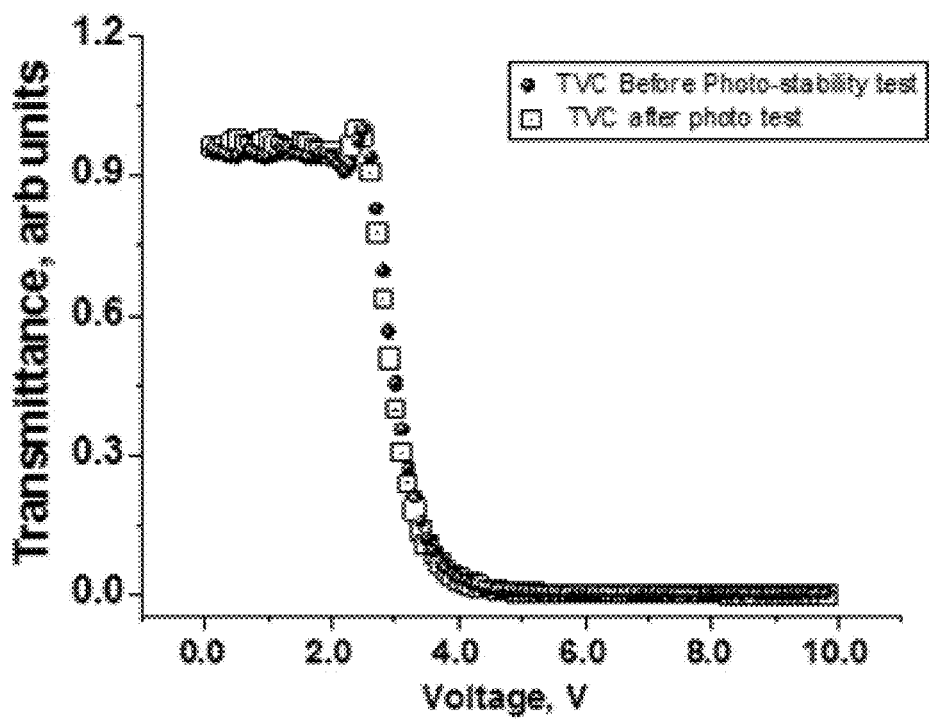
FIG. 10 shows the TVCs for an exemplary TN display cell before and after photo exposure.
Figure 11:
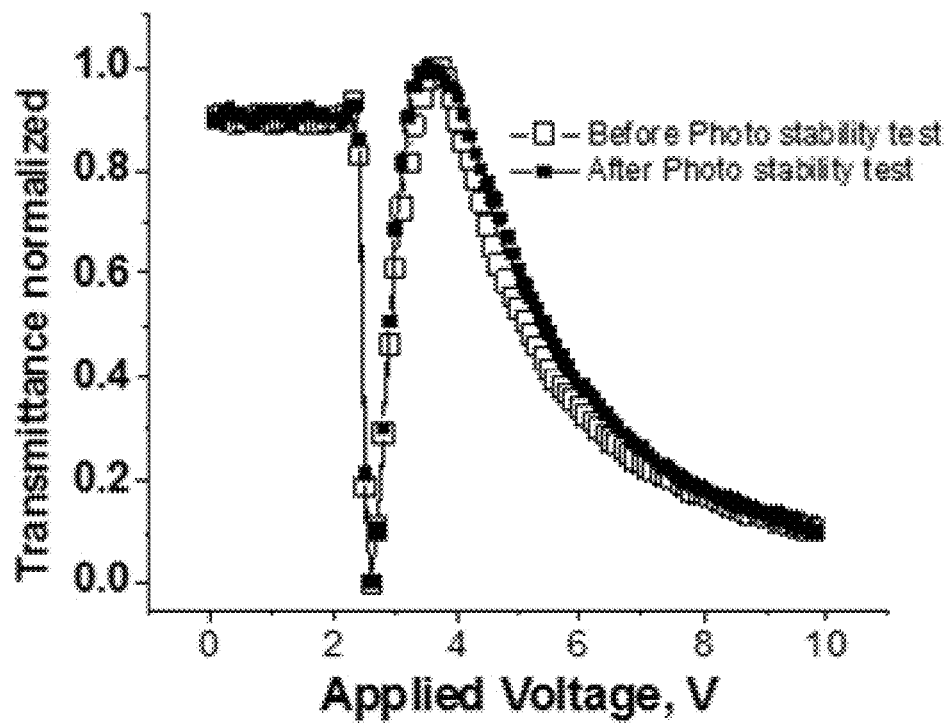
FIG. 11 shows the TVCs for an exemplary ECB nematic display cell before and after photo exposure.

The composite photoalignment layer was also demonstrated as being optically stable and did not show any degradation after photo exposure to a light source with 400 J/cm$^2$ of energy at a wavelength of 450 nm. As shown in FIGS. 10 and 11, the TVCs for exemplary display cells having the composite photoalignment layer were unaffected after the photo exposure. FIG. 10 shows the TVCs for an exemplary TN display cell before and after the photo exposure. FIG. 11 shows the TVCs for an exemplary ECB nematic display cell before and after the photo exposure. The alignment quality of the exemplary display cells were also unaffected by the photo exposure, as was apparent from visual inspection.

Figure 12:
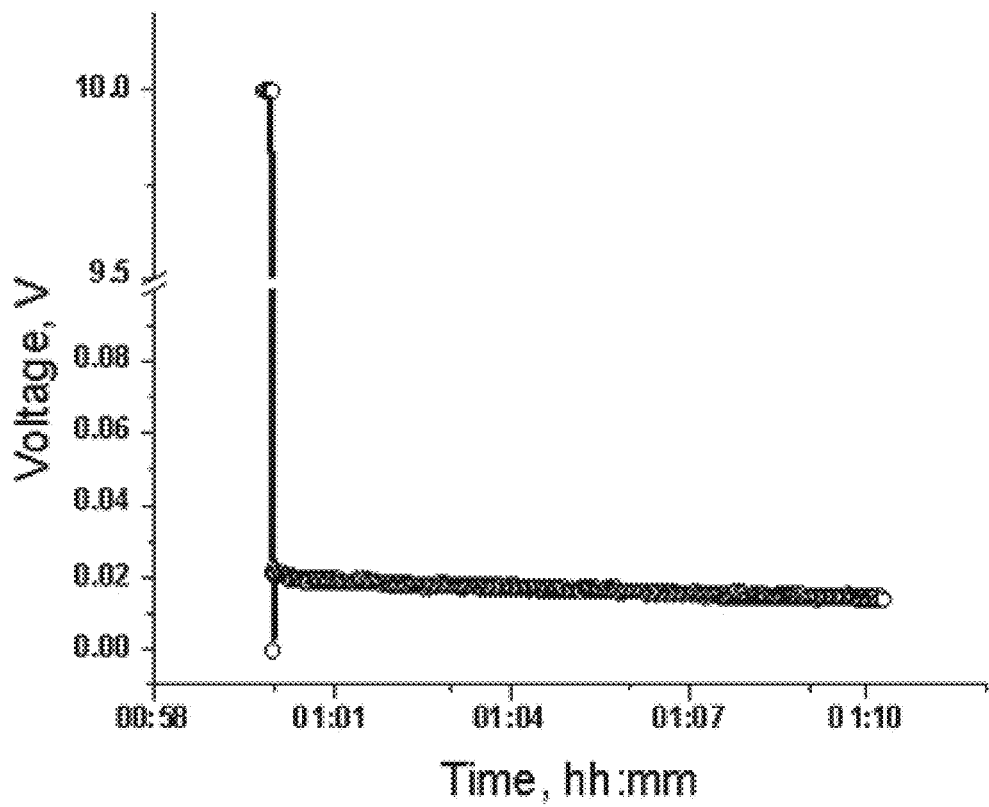
FIG. 12 is a plot showing the time-dependence of residual direct current (RDC) voltage of an exemplary composite photoalignment layer after stress of 10V for 1 hour.

In an exemplary implementation, the composite photoalignment layer manifests low RDC voltage, e.g., under 10 mV in an example where a DC soak of 10V is performed for an hour at 60° C. FIG. 12 shows the time-dependence of the RDC voltage of an exemplary composite photoalignment layer after stress of 10V for 1 hour.

Figure 13:
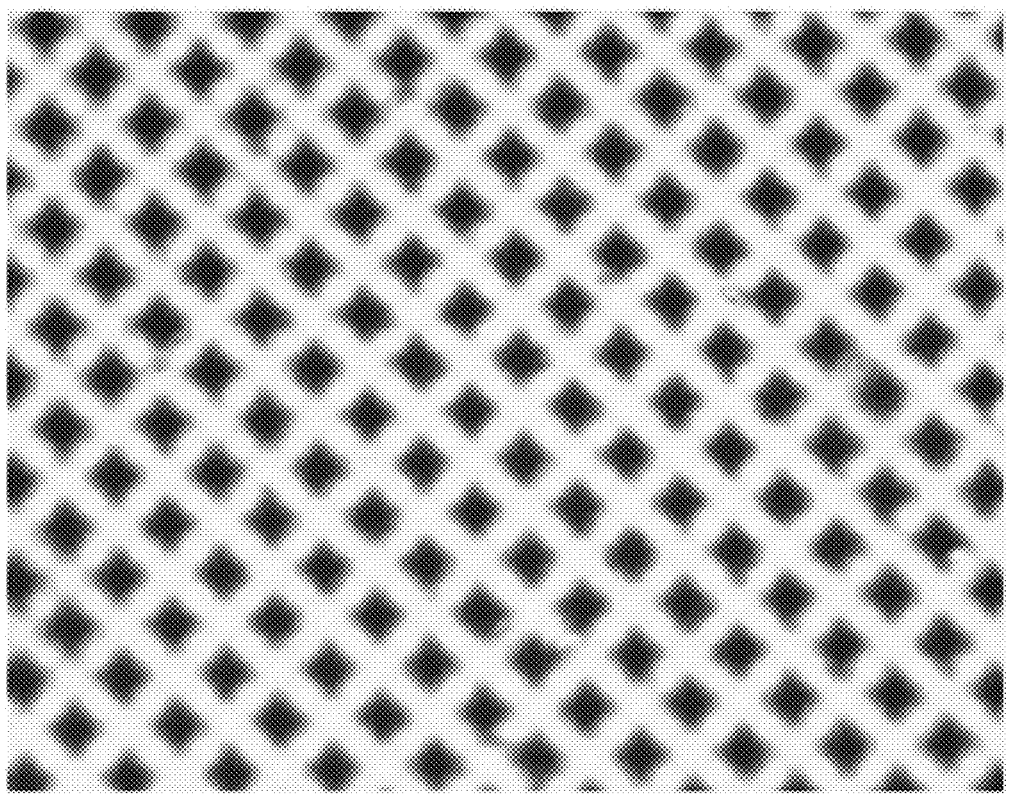
FIG. 13 is an image depicting an example of the optical texture of a multi-domain alignment.

In an exemplary implementation, during the single step exposure at stage 703 of FIG. 7, a phase mask is used to provide two or more alignment domains with distinct alignment directions in neighboring domains for the composite photoalignment layer. As a result, the irradiated substrate provides multi-domain alignment that is stable and resistant to thermal and photo exposure, while having high quality optical and electrical parameters. An example of the optical texture of a multi-domain alignment having a checker board pattern with a characteristic size of 20 μm is depicted in FIG. 13.

Exemplary embodiments of the invention thus provide a composite photoalignment layer with full polymerization of the monomer, while providing acceptable values for residual DC voltage, image sticking parameter, and voltage holding ratio. In an example, a composite photoalignment layer with full polymerization of the monomer provides a minimum and acceptable residual DC voltage value of 0.008 V, a minimum and acceptable image sticking parameter ratio of 1.01, and a minimum and acceptable voltage holding ratio of more than 99% at 60° C. and 60 Hz frame frequency.

In certain exemplary embodiments, alignment quality is correlated with the environmental humidity level at which the photoalignment materials (e.g., azo dye material, photo-polymerized azo dye composite layers, and thermally-polymerized azo dye composite layers) are processed. For example, LC cells for which processing was performed at different environmental humidity levels may exhibit different behaviors—e.g., relating to photo-induced phase retardation, an order parameter of the alignment layer, and/or alignment quality.

To achieve a desired environmental humidity level for testing the effects of environmental humidity level during processing a photoalignment material, in an exemplary embodiment, the photoalignment material is prepared in an Argon-filled glove box, wherein the water molecules in the environment are controlled to within 0.5 ppm (with relative humidity being lower than 1%). The photoalignment material is dissolved in solvent and spin-coated onto a substrate to form a uniform thin film within the glove box. The film is then put into a sealed chamber and taken out of the glove box. The sealed chamber is then connected with a humidity generator to achieve equilibrium at a desired environmental humidity. Then, the film is exposed to polarized UV light to create a preferred alignment direction.

Figure 14:
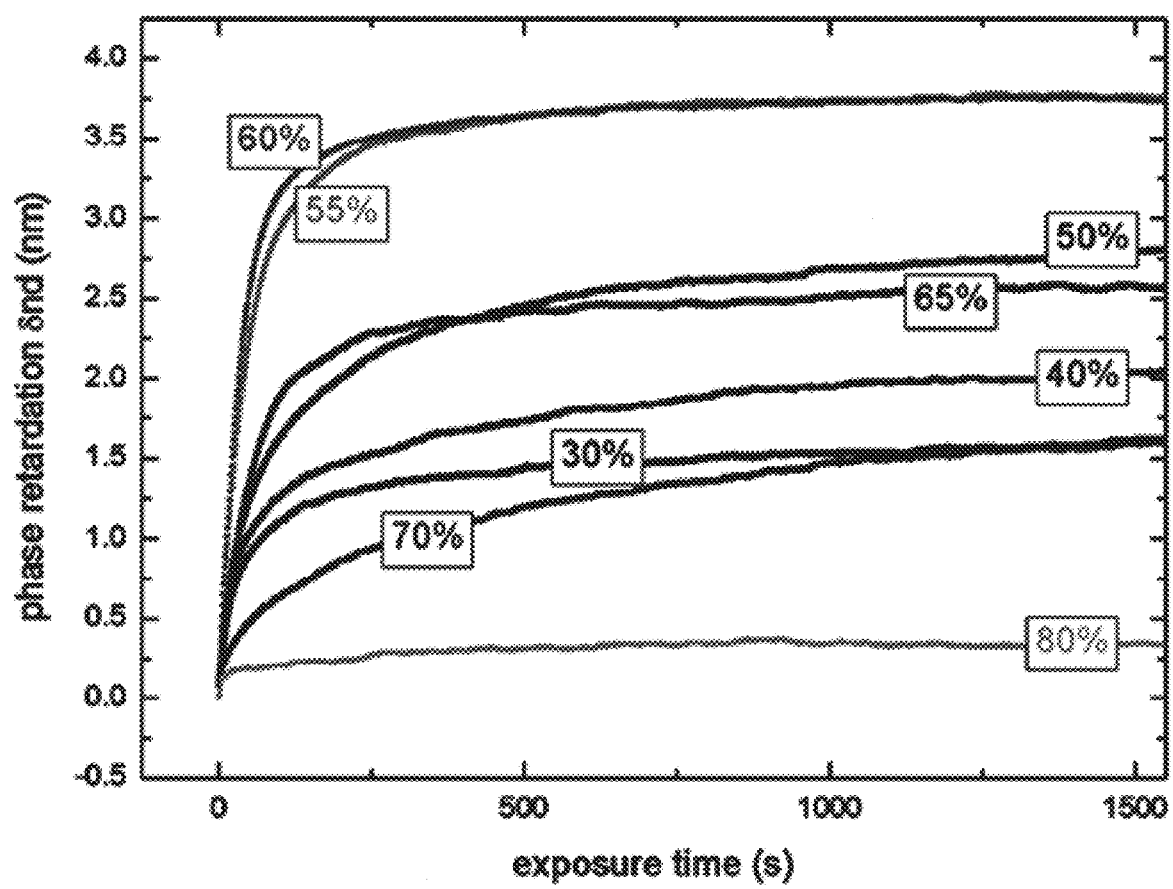
FIG. 14 is a graph depicting in situ phase retardation for an exemplary photo-polymerized composite photoalignment layer at different environmental humidity levels (ranging from 10% to 80% relative humidity) as a function of exposure time.
Figure 15:
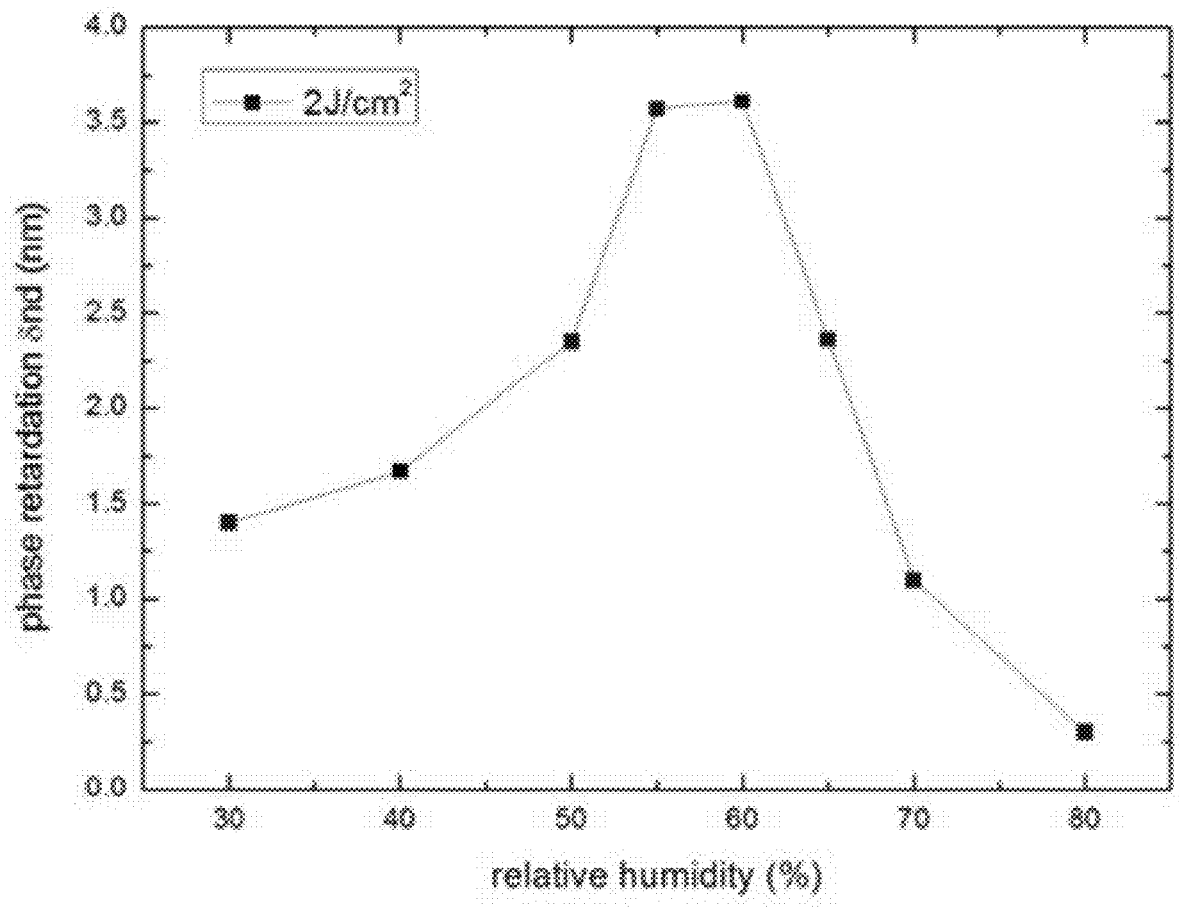
FIG. 15 is a graph depicting phase retardation for an exemplary photo-polymerized composite photoalignment layer as a function of relative humidity after being exposed with linearly polarized 365 nm UV light with an exposure dosage of 2 J/cm.
Figure 16:
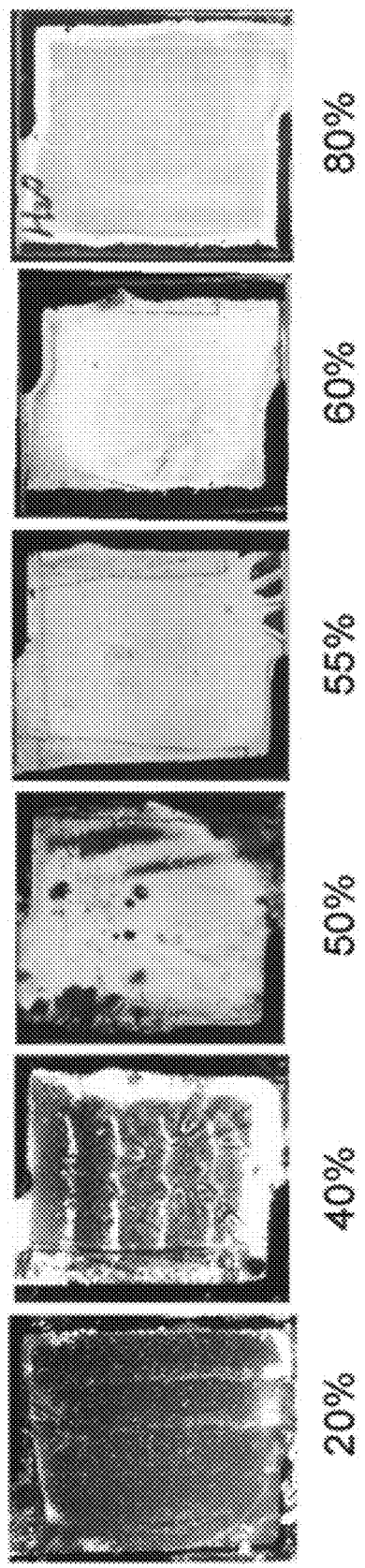
FIG. 16 depicts images of various examples of TN LC cells, under crossed polarizers, the TN LC cells being made using orthogonally-aligned composite photoalignment layers (polymerized via photo polymerization) on respective substrates of the TN LC cells corresponding to different environmental humidity levels (20%, 40%, 50%, 55%, 60%, 80%) under the same exposure conditions (linearly polarized 365 nm UV light with an exposure dosage of 2 $J/cm^2$).

In an exemplary embodiment, for a composite photoalignment layer which is polymerized using a photo-initiator (for example, as discussed above in connection with FIG. 1), a desirable environmental relative humidity processing window may be, for example, 50%-75%, with 55%-70% relative humidity being preferred to achieve good planar alignment quality. FIG. 14 is a graph depicting in situ phase retardation for a photo-polymerized composite photoalignment layer at different environmental humidity levels (ranging from 10% to 80% relative humidity) as a function of exposure time, showing the dynamic change of phase retardation as a function of time (exposure energy), where the exposure energy increases from 0 to about 9 J/cm$^2$. FIG. 15 is a graph depicting phase retardation for a photo-polymerized composite photoalignment layer as a function of relative humidity after being exposed with linearly polarized 365 nm UV light with an exposure dosage of 2 J/cm$^2$. After exposure, the photoaligned films were soft baked at 120° C. for 10 min to evaporate the solvent. FIG. 16 depicts images of various examples of TN LC cells, under crossed polarizers, the TN LC cells being made using orthogonally-aligned composite photoalignment layers (polymerized via photo polymerization) on respective substrates of the TN LC cells corresponding to different environmental humidity levels (20%, 40%, 50%, 55%, 60%, 80%) under the same exposure conditions (linearly polarized 365 nm UV light with an exposure dosage of 2 J/cm$^2$). In some situations at low humidity levels, homeotropic alignment, rather than planar alignment, was observed.

Figure 17:
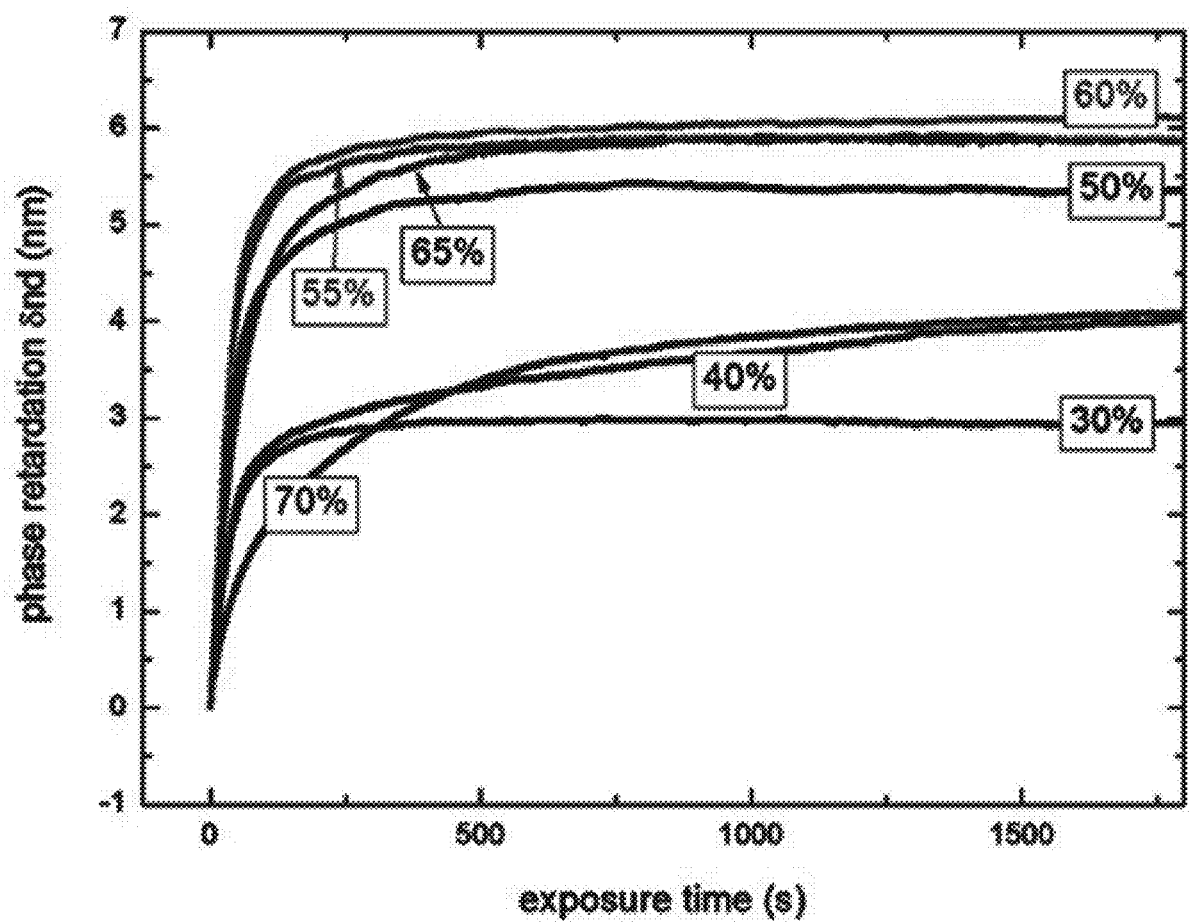
FIG. 17 is a graph depicting in situ phase retardation for an exemplary thermally-polymerized composite photoalignment layer at different environmental humidity levels (ranging from 30% to 70% relative humidity) as a function of exposure time.
Figure 18:
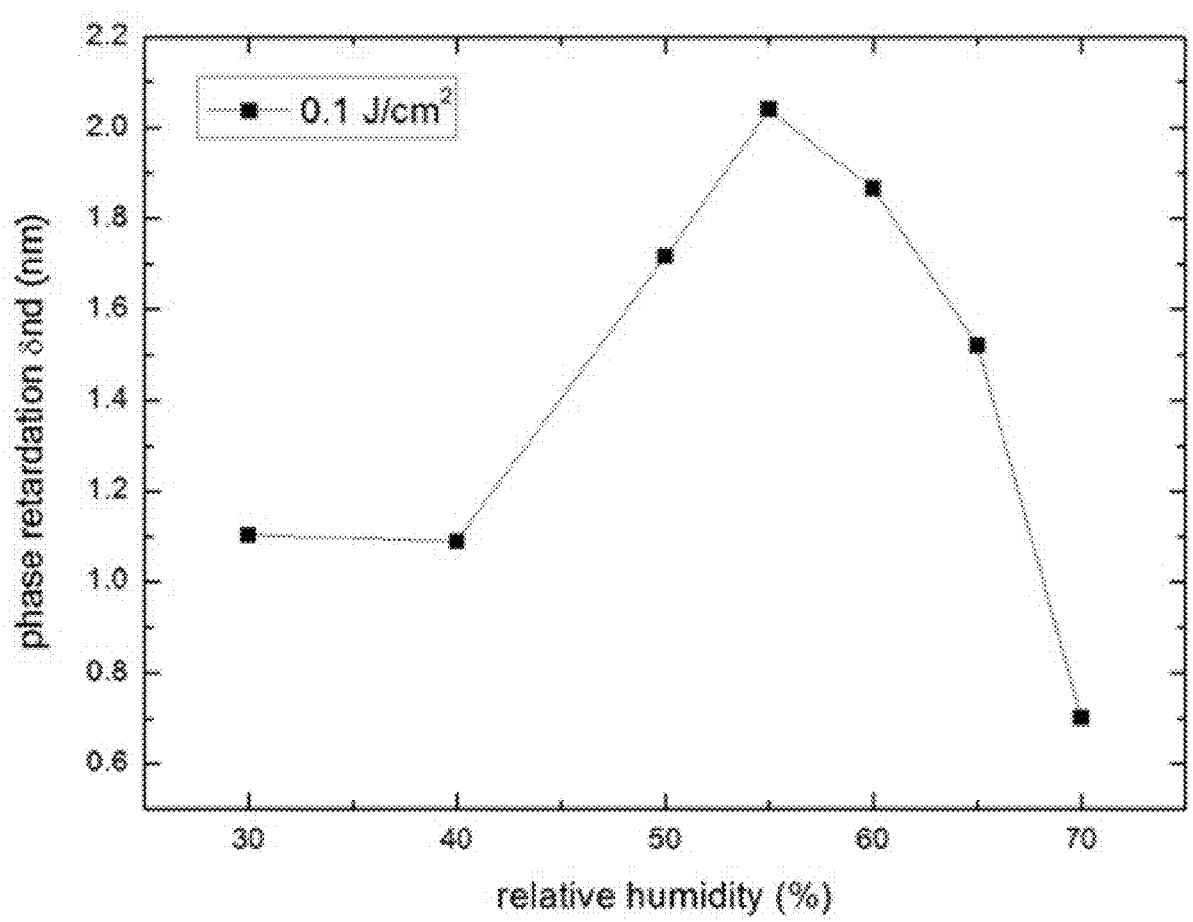
FIG. 18 is a graph depicting phase retardation for an exemplary thermally-polymerized composite photoalignment layer as a function of relative humidity after being exposed with linearly polarized 365 nm UV light with an exposure dosage of 0.1 $J/cm^2$.
Figure 19:
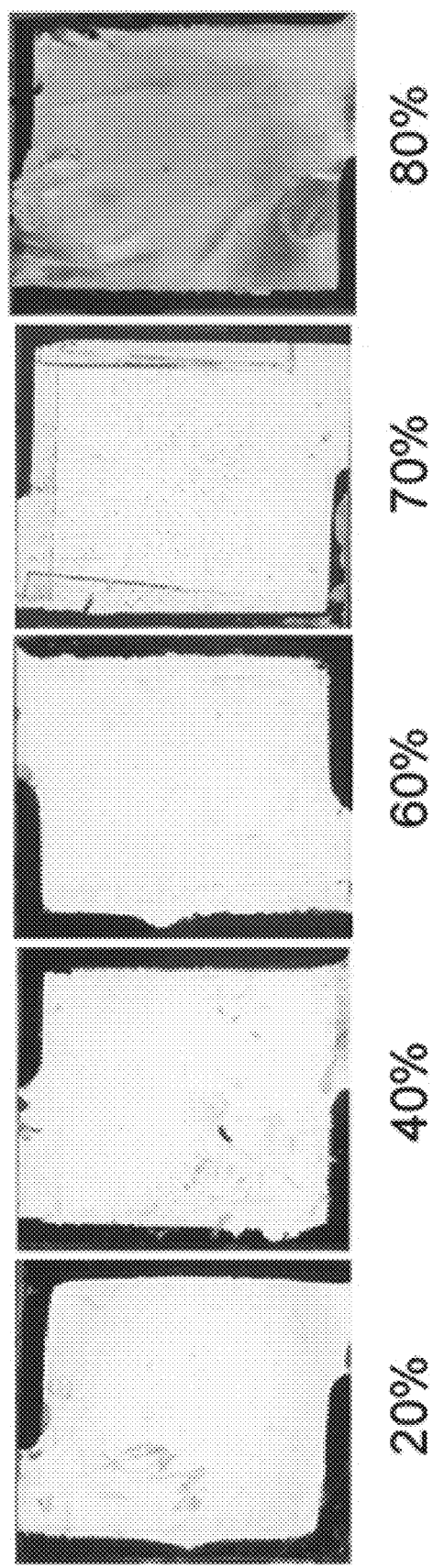
FIG. 19 depicts images of various examples of TN LC cells, under crossed polarizers, the TN LC cells being made using orthogonally-aligned composite photoalignment layers (polymerized via photo polymerization) on respective substrates of the TN LC cells corresponding to different environmental humidity levels (20%, 40%, 60%, 70%, 80%) under the same exposure conditions (linearly polarized 365 nm UV light with an exposure dosage of 0.1 $J/cm^2$).

In an exemplary embodiment, for a composite photoalignment layer which is polymerized using a thermal initiator (for example, as discussed above in connection with FIG. 1), a desirable environmental humidity window to achieve good planar alignment quality may be, for example, 0-75%, with 0-70% relative humidity being preferred to achieve good planar alignment quality. In an exemplary implementation, linearly polarized UV exposure (at a wavelength of 365 nm)

of 0.1 J/cm² is used for photo-reorientation, and the composite photoalignment layer is then hard baked for thermal polymerization at 230° C. for 30 minutes. FIG. 17 is a graph depicting in situ phase retardation for a thermally-polymerized composite photoalignment layer at different environmental humidity levels (ranging from 30% to 70% relative humidity) as a function of exposure time, showing the dynamic change of phase retardation as a function of time (exposure energy), where the exposure energy increases from 0 to about 9 J/cm². FIG. 18 is a graph depicting phase retardation for a thermally-polymerized composite photoalignment layer as a function of relative humidity after being exposed with linearly polarized 365 nm UV light with an exposure dosage of 0.1 J/cm². FIG. 19 depicts images of various examples of TN LC cells, under crossed polarizers, the TN LC cells being made using orthogonally-aligned composite photoalignment layers (polymerized via photo polymerization) on respective substrates of the TN LC cells corresponding to different environmental humidity levels (20%, 40%, 60%, 70%, 80%) under the same exposure conditions (linearly polarized 365 nm UV light with an exposure dosage of 0.1 J/cm²).

Figure 20:
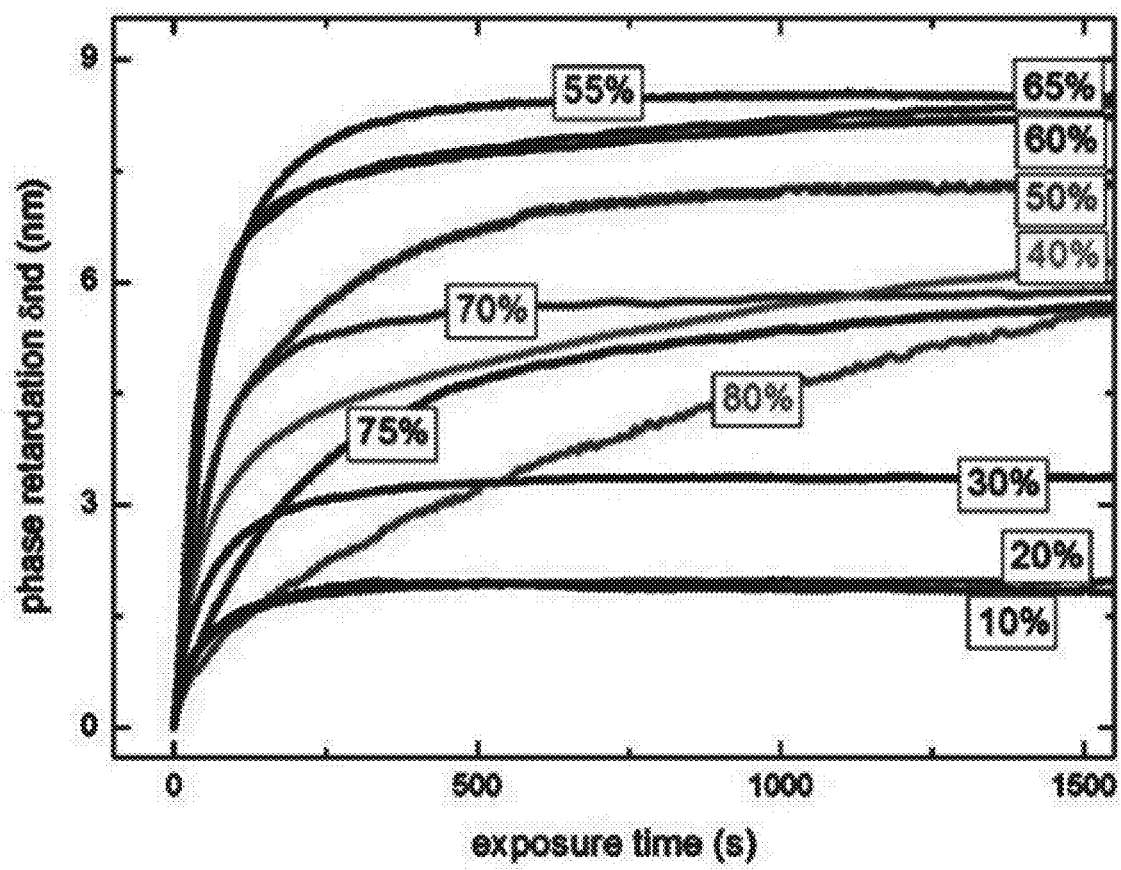
FIG. 20 is a graph depicting in situ phase retardation for an exemplary photoalignment layer at different environmental humidity levels (ranging from 10% to 80% relative humidity) as a function of exposure time to linearly polarized 365 nm UV light.
Figure 21:
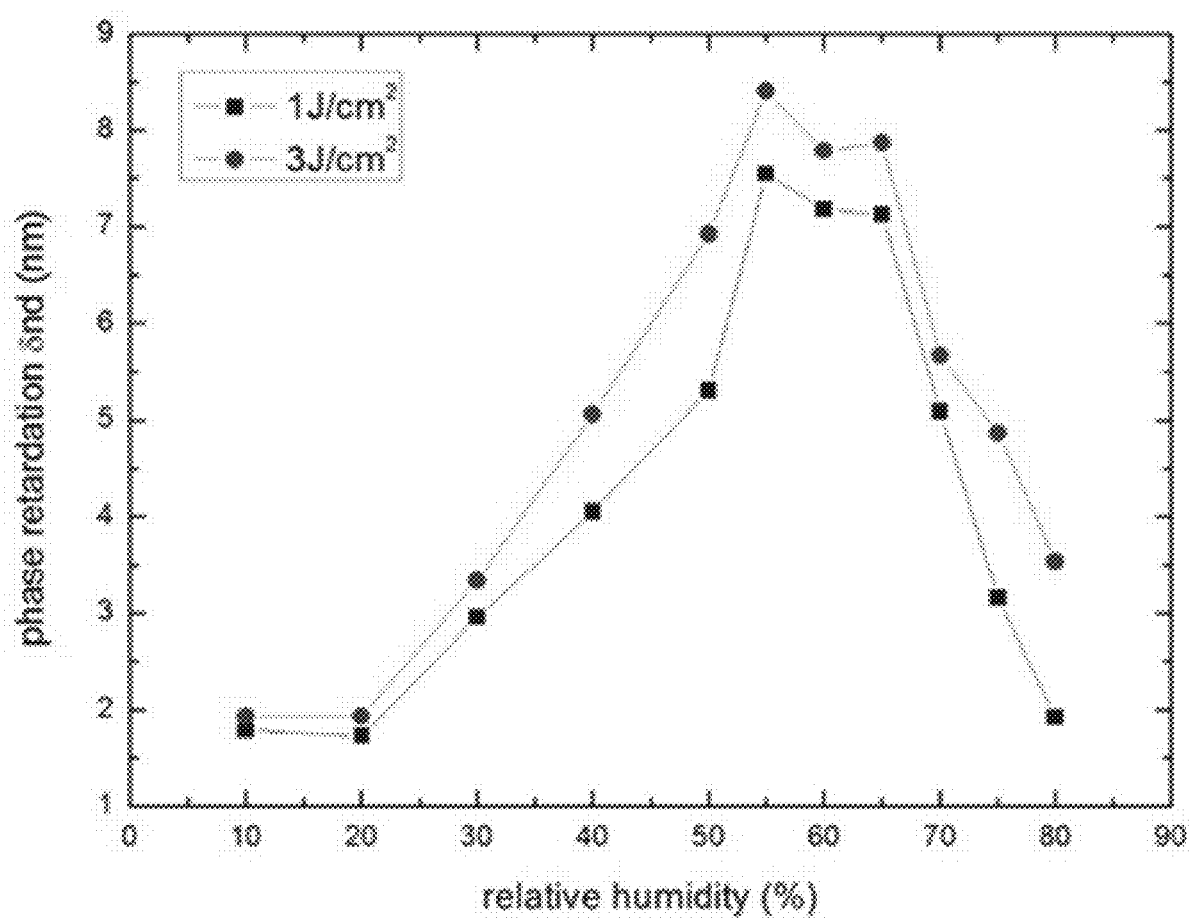
FIG. 21 is a graph depicting phase retardation for an exemplary photoalignment layer as a function of relative humidity after being exposed with linearly polarized 365 nm UV light with an exposure dosage of 1 $J/cm^2$ and 3 $J/cm^2$.
Figure 22:
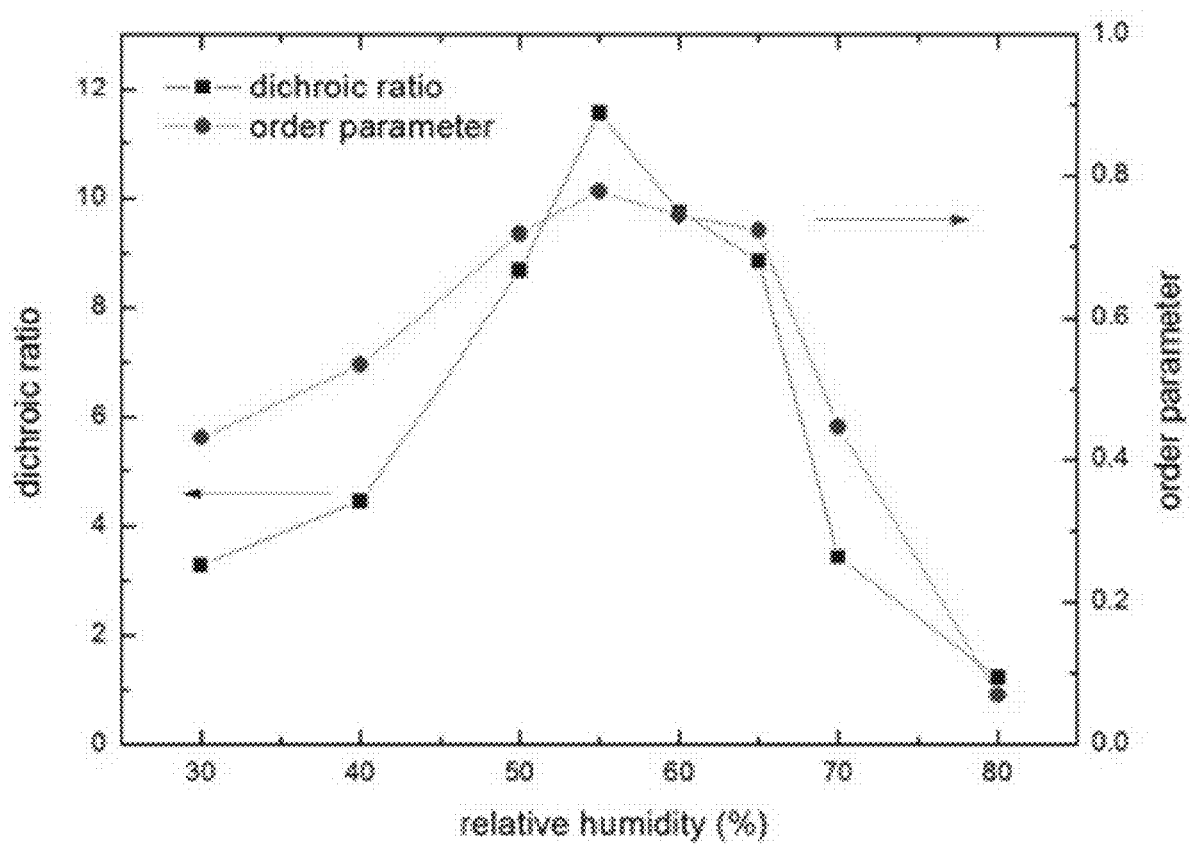
FIG. 22 is a graph depicting dichroic ratio and order parameter for a photoalignment layer as a function of relative humidity after being exposed with linearly polarized 365 nm UV light with an exposure dosage of 1 $J/cm^2$.
Figure 23:
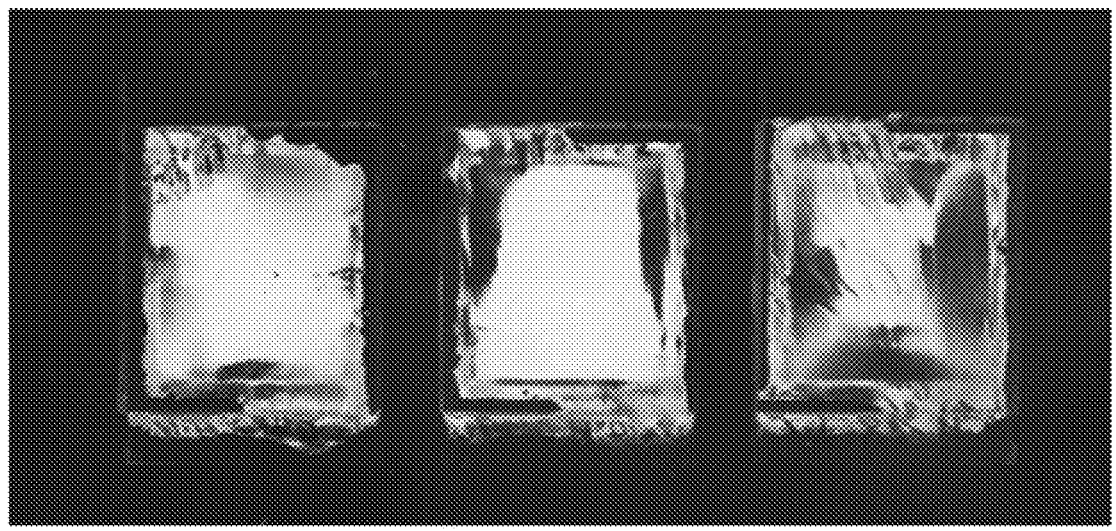
FIG. 23 depicts images of various examples of TN LC cells, under (a) crossed polarizers and (b) parallel polarizers, the TN LC cells being made using orthogonally photoaligned layers corresponding to different environmental humidity levels (40%, 60%, and 80% relative humidity from left to right) under the same exposure conditions (linearly polarized 365 nm UV light with an exposure dosage of 1 $J/cm^2$).
Figure 23:

It will be appreciated that the environmental humidity range for processing photoalignment materials discussed herein is also applicable in other contexts, for example, with respect to other types of photonic devices and displays. In an exemplary embodiment, for a photoalignment layer which is just an azo dye film (e.g., an SD film), a desirable environmental humidity window to achieve good planar alignment quality may be, for example, 40%-75% relative humidity, with 50%-70% relative humidity being preferred to achieve good planar alignment quality. To achieve a desired environmental humidity level for testing the effects of environmental humidity level during processing a photoalignment material, in an exemplary implementation, a photoalignment film is spin-coated onto a substrate and then soft baked at 100° C. for 10 min in a glove box. The photoalignment film is then put in a sealed chamber and taken out of the glove box. FIG. 20 is a graph depicting in situ phase retardation for a photoalignment layer at different environmental humidity levels (ranging from 10% to 80% relative humidity) as a function of exposure time to linearly polarized 365 nm UV light, showing the dynamic change of phase retardation as a function of time (exposure energy), where the exposure energy increases from 0 to about 9 J/cm². FIG. 21 is a graph depicting phase retardation for a photoalignment layer as a function of relative humidity after being exposed with linearly polarized 365 nm UV light with an exposure dosage of 1 J/cm² and 3 J/cm². FIG. 22 is a graph depicting dichroic ratio and order parameter for a photoalignment layer as a function of relative humidity after being exposed with linearly polarized 365 nm UV light with an exposure dosage of 1 J/cm². FIG. 23 depicts images of various examples of TN LC cells, under (a) crossed polarizers and (b) parallel polarizers, the TN LC cells being made using orthogonally photoaligned layers corresponding to different environmental humidity levels (40%, 60%, and 80% relative humidity from left to right) under the same exposure conditions (linearly polarized 365 nm UV light with an exposure dosage of 1 J/cm²). The alignment quality of each of the TN LC cells can be seen in FIG. 23, with 60% relative humidity corresponding to the best alignment quality (with high ordering and strong anchoring to the liquid crystals) in this example (between crossed polarizers, TN LC cells having good alignment quality appear bright, and between parallel polarizers, TN LC cells appear dark).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A composite photoalignment layer for aligning liquid crystal molecules, comprising:
    a monomeric material;
    a photoinitiator; and
    an azo dye material;
    wherein a ratio of the monomeric material and the azo dye material is 50:50; and
    wherein a concentration of the photoinitiator is within the range of 1% wt/wt of the monomeric material to 30% wt/wt of the monomeric material;
    wherein absorption bands of the photoinitiator and the azo dye material have overlapping wavelengths to facilitate both alignment and polymerization being performed on the composite photoalignment layer through a single-step exposure using a light source.

2. The composite photoalignment layer according to claim 1, wherein the concentration of the photoinitiator is 10% wt/wt of the monomeric material.

3. The composite photoalignment layer according to claim 1, wherein the composite photoalignment layer is configured to be exposed to a polarized light source for imposing a single-domain or multi-domain alignment on the composite photoalignment layer and polymerizing the monomeric material to form a solid thin film.

4. The composite photoalignment layer according to claim 1, wherein the composite photoalignment layer is coated onto a substrate surface.

5. The composite photoalignment layer according to claim 4, wherein the composite photoalignment layer is configured to be coated onto the substrate surface via spin coating, doctor blading, or screen printing.

6. The composite photoalignment layer according to claim 1, wherein the photoinitiator is 1-hydroxycyclohexyl phenyl ketone.

7. The composite photoalignment layer according to claim 1, wherein the monomeric material is a liquid crystalline reactive mesogen.

8. The composite photoalignment layer according to claim 1, wherein the azo dye material is sulfonic azo dye tetrasodium5,5'-((1E,1'E)-(2,2'-disulfonato-[1,1'-biphenyl]-4,4'-diyl)bis(diazene-2,1-diyl))bis(2-hydroxybenzoate).

9. The composite photoalignment layer according to claim 1, wherein the light source is an ultraviolet light source.

10. The composite photoalignment layer according to claim 1, wherein the light source provides polarized light.

11. A method for preparing a composite photoalignment layer for aligning liquid crystal molecules, comprising:
mixing, in solution form, a monomeric material, a photoinitiator, and an azo dye material, wherein a ratio of the monomeric material and the azo dye material is 50:50, and wherein a concentration of the photoinitiator is within the range of 1% wt/wt of the monomeric material to 30% wt/wt of the monomeric material;
coating the mixed solution onto a substrate to form a thin film; and
exposing the thin film to polarized light to form a solid thin film, wherein exposing the thin film is a single step exposure that provides both alignment and polymerization for the composite photoalignment layer, wherein absorption bands of the photoinitiator and the azo dye material have overlapping wavelengths to facilitate both alignment and polymerization being performed on the composite photoalignment layer through the single-step exposure.

12. The method according to claim 11, wherein mixing, in solution form, the monomeric material, the photoinitiator, and the azo dye material comprises:
mixing the monomeric material and the azo dye material; and
adding the photoinitiator to the mixture of the monomeric material and the azo dye material.

13. The method according to claim 12, wherein the photoinitiator is added to the mixture of the monomeric material and the azo dye material at a concentration of 10% wt/wt of the monomeric material.

14. The method according to claim 11, wherein exposing the thin film is performed under environmental humidity conditions in the range of 50%-75% relative humidity.

15. The method according to claim 11, wherein exposing the thin film is performed under environmental humidity conditions in the range of 55%-70% relative humidity.

16. The method according to claim 11, wherein a phase mask is used during exposure of the thin film to the polarized light to rotate a plane of impinging light.

17. The method according to claim 16, wherein the phase mask provides two or more alignment domains for the composite photoalignment layer.

* * * * *